US009077423B2

(12) United States Patent
Xin et al.

(10) Patent No.: US 9,077,423 B2
(45) Date of Patent: *Jul. 7, 2015

(54) MULTIPLE INPUT MULTIPLE OUTPUT USER EQUIPMENT RADIO FREQUENCY ASSISTANT SYSTEM

(71) Applicant: BLACKBERRY LIMITED, Waterloo (CA)

(72) Inventors: Yan Xin, Kanata (CA); Shouxing Qu, Gloucester (CA); Arnold Sheynman, Northbrook, IL (US); Christopher Andrew DeVries, Waterloo (CA); Daniel Noel Badiere, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,519

(22) Filed: Oct. 11, 2013

(65) Prior Publication Data

US 2014/0038585 A1 Feb. 6, 2014

Related U.S. Application Data

(63) Continuation of application No. 12/698,855, filed on Feb. 2, 2010, now Pat. No. 8,583,035.

(51) Int. Cl.
*H04B 7/15* (2006.01)
*H04B 1/38* (2006.01)
(Continued)

(52) U.S. Cl.
CPC ................ *H04B 7/15* (2013.01); *H04B 7/0413* (2013.01); *H04B 7/12* (2013.01); *H04B 7/15542* (2013.01)

(58) Field of Classification Search
USPC ........ 455/7, 11.1, 41.1, 41.2, 63.1, 67.13, 68, 455/88, 101, 272, 420, 556.1, 557
See application file for complete search history.

(56) References Cited

U.S. PATENT DOCUMENTS 5,628,049 A 5/1997 Suemitsu
6,141,533 A 10/2000 Wilson et al.
(Continued)

FOREIGN PATENT DOCUMENTS

CN 1838563 A 9/2006
CN 101359956 A 2/2009
(Continued)

OTHER PUBLICATIONS

3GPP TR36.913 V8.0.0 (Jun. 2008) Technical Report, •3rd Generation Partnership Project; Technical Specification Group Radio Access Network; Requirements for Further Advancements for E-UTRA,• (LTE-Advanced) (Release 8) Jun. 2008, pp. 1-14.
(Continued)

*Primary Examiner* — Quochien B Vuong
(74) *Attorney, Agent, or Firm* — Conley Rose, P.C.; J. Robert Brown, Jr.

(57) ABSTRACT

A user equipment and a wireless radio frequency assistant in a communication system that supports multiple input multiple output. The wireless radio frequency assistant and the user equipment operate together as a single system. The user equipment controls and activates the wireless radio frequency assistant to transform a first frequency of a radio frequency signal transmitted to the system of user equipment and the wireless radio frequency assistant to a second frequency. The wireless radio frequency assistant transmits the second frequency to the user equipment.

20 Claims, 11 Drawing Sheets

(51) Int. Cl.

| | |
|---|---|
| ***H04B 7/155*** | (2006.01) |
| *H04B 7/04* | (2006.01) |
| *H04B 7/12* | (2006.01) |

(56) References Cited

U.S. PATENT DOCUMENTS

| | | | |
|---|---|---|---|
| 6,584,080 | B1 | 6/2003 | Ganz et al. |
| 6,785,511 | B1 | 8/2004 | Hengeveld et al. |
| 6,990,313 | B1 | 1/2006 | Yarkosky |
| 7,139,527 | B2 | 11/2006 | Tamaki et al. |
| 7,418,050 | B1 | 8/2008 | Gardner et al. |
| 2004/0131025 | A1 | 7/2004 | Dohler et al. |
| 2006/0217093 | A1 | 9/2006 | Wang et al. |

FOREIGN PATENT DOCUMENTS

| | | | |
|---|---|---|---|
| EP | 1705843 | A1 | 9/2006 |
| JP | 2007282046 | | 10/2007 |
| JP | 2008252491 | | 10/2008 |
| KR | 100795279 | B1 | 1/2008 |

OTHER PUBLICATIONS

"3GPP—A Global Initiative," pp. 1-2, retrieved Dec. 28, 2009 http://www.3gpp.org/.

Alamouti, "A Simple Transmit Diversity Technique for Wireless Communications," IEEE J. Select. Commun., vol. 8, No. 8, pp. 1451-1458, 1998.

Borade et al., "Amplify-and-Forward in Wireless Relay Networks: Rate, Diversity, and Network Size," IEEE Trans. Information Theory, vol. 53, No. 10, pp. 3302-3318, Oct. 2007.

Canadian Office Action dated Apr. 15, 2013 for Application No. 2,730,827.

Chandrasekhar et al., "Femtocell Networks: A Survey," IEEE Communications Magazine, vol. 46, Issue 9, pp. 59-67, Sep. 2008.

Chizhik et al., "Effect of Antenna Separation on the Capacity of BLAST in Correlated Channels," IEEE Communication Letters, vol. 4., No. 11, pp. 337-339, Nov. 2000.

Chinese Office Action dated May 9, 2013 for Application No. 201110036164.6.

European Search Report dated Apr. 26, 2013 for Application No. 11152967.3-1855.

Femtoforum—Driving Convergence Worldwide,• retrieved Dec. 28, 2009, 1 page http:/www.femtoforum.org/femto/.

Foschini, "Layered Space-Time Architecture for Wireless Communication in a Fading Environment When Using Multi-Element Antennas," Bell Labs Tech. J., vol. 1, No. 2, pp. 41-59, 1996.

Jing et al., •Distributed Space-Time Coding in Wireless Relay Networks,• IEEE Trans. Wireless Commun., vol. 5, No. 12, pp. 3524-3536, Apr. 2006.

Office Action dated Feb. 8, 2012 for Japanese Application No. 2011-20246.

Katz et al., "WiMAX Evolution: Emerging Technologies and Applications," ed., John Wiley & Sons, pp. 1-23, Mar. 2009.

Rysavy Research, "EDGE, HSPA and LTE—Broadband Innovation," 3G Americas, Sep. 2008, pp. 1-104.

Sendonaris et al., "User Cooperation Diversity, Part I and II," IEEE Trans. Communications, vol. 51, No. 11, pp. 1927-1948, Nov. 2003.

Telatar; "Capacity of Multi-Antenna Gaussian Channels"; http://mars.bell-labs.com/papers/proof; p. 1-28; Oct. 1995.

Vucetic et al., "Space-Time Coding," John Wiley& Sons, pp. 1-7, 2003.

"Bluetooth," Wikipedia, pp. 1-10 retrieved Dec. 28, 2009 http://en,wikipedia.org/wiki/Bluetooth.

Zheng et al., "Diversity and Multiplexing: A Fundamental Tradeoff in Multiple-Antenna Channels." IEEE Transactions on Information Theory, vol. 49, No. 5, pp. 1073-1096, May 2003.

Office Action dated May 1, 2014 for Canadian Application No. 2,730,827. 3 pages.

Chinese Office Action dated Sep. 5, 2014 for Application No. 201110036164.6, 8 pages.

English Translation Chinese Office Action dated Sep. 5, 2014 for Application No. 201110036164.6, 7 pages.

Xin, Yan, et al.; U.S. Appl. No. 12/698,855, filed Feb. 2, 2010; Title: Multiple Input Multiple Output User Equipment Radio Frequency Assistant System.

Office Action dated Oct. 7, 2011; U.S. Appl. No. 12/698,855, filed Feb. 2, 2010; 17 pages.

Final Office Action dated Apr. 26, 2012; U.S. Appl. No. 12/698,855, filed Feb. 2, 2010; 19 pages.

Notice of Allowance dated Jul. 10, 2013; U.S. Appl. No. 12/698,855, filed Feb. 2, 2010; 10 pages.

Chinese Office Action; Application No. 201110036164.6; Feb. 19, 2014; 11 pages.

Japanese Office Action as Recieved in Co-pending Application No. 2011-020246 on Jan. 4, 2013; 2 pages. (No English translation available).

Korean Office Action; Application No. 10-2011-0010260; May 30, 2012; 11 pages.

Taiwan Office Action; Application No. 100103997; Jul. 19, 2013; 15 pages.

Chinese Office Action as Received in Co-pending Application No. 201110036164.4 on Mar. 9, 2015; 7 pages. (No English translation available).

| COMMAND/ EVENTS \ CURRENT STATE | NULL 810 | SLEEP 820 | ACTIVE 830 |
|---|---|---|---|
| POWER_OFF 840 | IGNORE 860 | NULL 810 / TURN ASSISTANT OFF 864 | IGNORE 860 |
| POWER_OFF EVENT 842 | IGNORE 860 | NULL 810 / TURN ASSISTANT OFF 864 | NULL 810 / TURN ASSISTANT OFF 864 |
| POWER_ON EVENT 844 | SLEEP 820 / TURN ASSISTANT ON 862 | IGNORE 860 | IGNORE 860 |
| ENABLE_ASSISTANT 846 | IGNORE 860 | ACTIVE 830 / 868 ACTIVATE FREQUENCY TRANSFORMER | IGNORE 860 |
| CHANGE_CHANNEL 848 | IGNORE 860 | IGNORE 860 | ACTIVE 830 / 880 ADJUST FREQUENCY TRANSFORMER CHANNEL |
| CHANGE_SIGNAL_GAIN 850 | IGNORE 860 | IGNORE 860 | ACTIVE 830 / 876 ADJUST GAIN LEVEL OF FREQUENCY TRANSFORMER |
| GET_STATUS 852 | IGNORE 860 | SLEEP 820 / 870 SEND STATUS MESSAGE | ACTIVE 830 / SEND STATUS MESSAGE 870 |
| CHANGE_FREQUENCY 854 | IGNORE 860 | IGNORE 860 | ACTIVE 830 / 872 ADJUST REFERENCE OSCILLATOR FREQUENCY |
| DISABLE_ASSISTANT 856 | IGNORE 860 | IGNORE 860 | SLEEP 820 / 874 DISABLE FREQUENCY TRANSFORMER |
| TRANSFORMER_DISABLED EVENT 858 | IGNORE 860 | IGNORE 860 | SLEEP 820 / 878 TRANSFORMER DISABLED STATUS MESSAGE |

NEXT STATE / ACTION

KEY

FROM FIG. 9B
B
Begin
902
Send GET_STATUS Command to Assistant
904
Status received from Assistant?
No
Assistant is powered off; alert user
906
Yes
908
Assistant in sleep mode?
Yes
No
Send DISABLE_ASSISTANT Command to Assistant
910
Request for data transfer?
Yes
A
TO FIG. 9B
912
No
Require Assistant power down?
No
914
Yes
Send POWER_OFF Command to Assistant
916
END

MULTIPLE INPUT MULTIPLE OUTPUT USER EQUIPMENT RADIO FREQUENCY ASSISTANT SYSTEM

This application is a continuation of U.S. Non-Provisional application Ser. No. 12/698,855, entitled "MULTIPLE INPUT MULTIPLE OUTPUT USER EQUIPMENT RADIO FREQUENCY ASSISTANT SYSTEM", filed Feb. 2, 2010, which is incorporated herein by reference in its entirety.

BACKGROUND

1. Technical Field

This disclosure relates to multiple input multiple output wireless communication systems that include base stations and user equipment. More particularly, this disclosure relates to a wireless communication system that includes a radio frequency assistant configured by user equipment to assist in radio frequency signal transmissions.

2. Description of the Related Art

Multiple input multiple output technology increases the strength, power, and reliability of wireless signal transmissions through the implementation of multiple antennas. The use of multiple input multiple output technology uses a plurality of antennas to enhance performance through increased data transmission and increased spatial diversity. In current spatial diversity systems, multiple antennas at a base station or multiple antennas at a terminal may operate at the same carrier frequency. For example, a plurality of antenna elements operating at a receiver may receive independent transmissions on the same carrier frequency and enhance performance by decreasing the amount of interference with a signal. Similarly, a plurality of antenna elements at a transmitter increases the capacity of the data transmission.

In current spatial diversity systems, the spacing between the antennas at a transmitter and the antennas at a receiver may have an impact on the correlation between the transmitter antennas and between the receiver antennas. The correlation between closely spaced antennas may reduce any multiple input multiple output spatial diversity and multiplexing gains. Generally, correlation decreases with an increase in antenna separation. Experimental results and measurements suggest that antennas may be decorrelated at a transmitter or a receiver by spacing apart antenna elements at about a physical distance of half-lambda, $$\frac{\lambda}{2},$$

where $\lambda$ is the wavelength of a carrier radio wave or radio frequency signal. The experimental results and measurements also show that receiver antennas benefit from performance improvements up to a distance of approximately $3\lambda$.

For example, at a frequency of 700 MHz, a physical distance of half-lambda, or approximately 21.4 cm, would be required for antenna decorrelation to achieve independent antenna operation. In a compact wireless device, such as a handset or similar wireless cellular system, this physical spacing between multiple antennas is challenging to achieve on a single device because of the limited amount of space available within such small devices.

BRIEF DESCRIPTION OF THE DRAWINGS

For a better understanding of the disclosure and the various embodiments described herein, reference is now made to the following brief description, taken in connection with the accompanying drawings and detailed description, which show at least one illustrative embodiment.

FIG. 8 is a diagram of a state table that provides details of the state machine of the radio frequency assistant of FIG. 7 in accordance with an illustrative embodiment of the disclosure;

DETAILED DESCRIPTION

Figure 1:
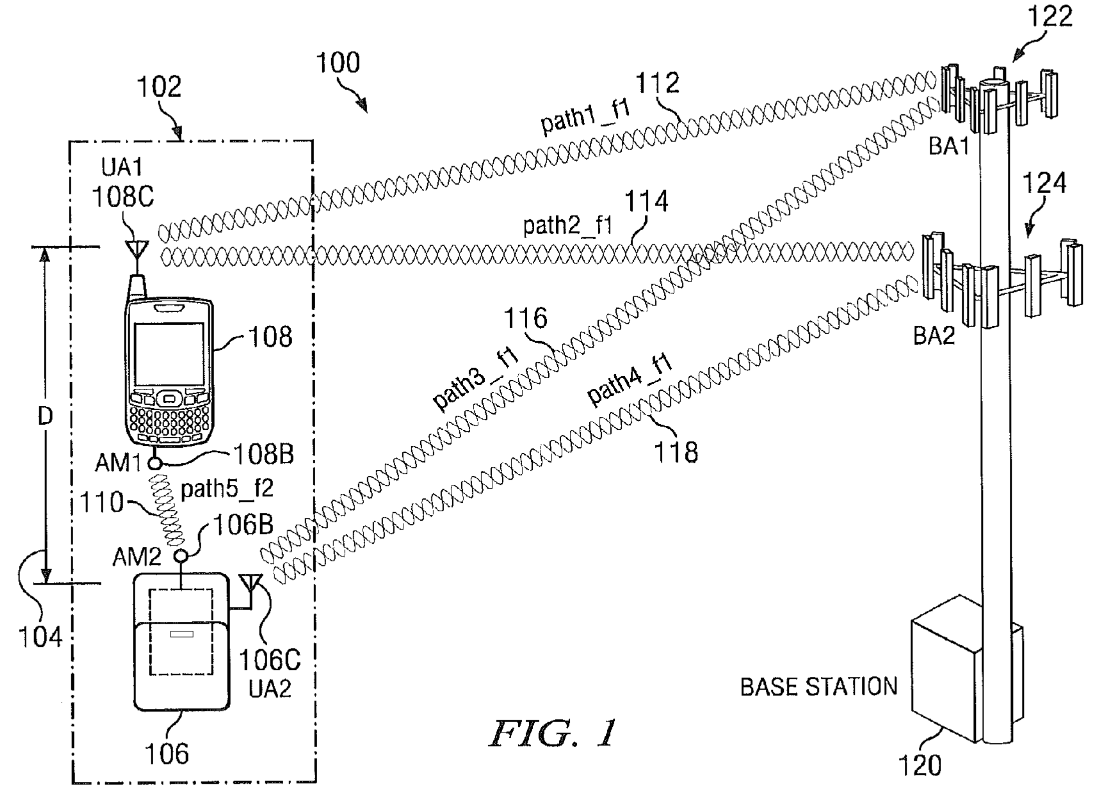
FIG. 1 is a top level system diagram of a two-by-two multiple input multiple output wireless communication system in accordance with an illustrative embodiment of the disclosure.

It should be understood at the outset that although an illustrative implementation of one or more embodiments are provided below, the description is not to be considered as limiting the scope of the embodiments described herein. The disclosure may be implemented using any number of techniques, whether currently known or in existence. The disclosure should in no way be limited to the illustrative implementations, drawings, and techniques illustrated and described herein, which may be modified within the scope of the appended claims along with a full scope of equivalence. It should be appreciated that for simplicity and clarity of illustration, where considered appropriate, the reference numerals may be repeated among the figures to indicate corresponding or analogous elements.

According to one illustrative embodiment, a wireless communication system comprises a radio frequency assistant that is activated to transform and repeat a radio frequency signal responsive to commands the radio frequency assistant receives wirelessly. The wireless communication system includes user equipment that configures and controls the radio frequency assistant through the wireless commands. The radio frequency assistant and the user equipment are configured to operate together as a single system.

In accordance with another embodiment of the disclosure, a wireless apparatus that processes radio frequency signals comprises a frequency transformer that is configured to transform, responsive to a control signal, a first radio frequency signal received in a first radio frequency band to a second radio frequency signal in a second radio frequency band. The wireless apparatus also includes a first antenna communicatively coupled to the frequency transformer to receive the first radio frequency signal in the first radio frequency band and transmit the transformed first radio frequency signal in the second radio frequency band to user equipment, responsive to wireless commands being received from the user equipment. The user equipment enables the control signal to control a configuration of the frequency transformer.

In accordance with a further embodiment of the disclosure, a method of assisting radio frequency transmissions in a wireless communication system is disclosed. The method comprises the actions of activating a radio frequency assistant with a user equipment to transform a first radio frequency signal to a second radio frequency signal responsive to commands being received from the user equipment, and transmitting the second radio frequency signal to the user equipment over a wireless link between the radio frequency assistant and the user equipment.

The present disclosure provides a user equipment assistant system with a plurality of antennas for wireless communication in a multiple input multiple output wireless system. The components of the user equipment assistant system include user equipment and a radio frequency assistant that is wirelessly coupled to the user equipment and is configured to operate together with the user equipment as a single wireless system. The user equipment and the radio frequency assistant each include at least one antenna that is separated at a distance (D) from each other. User equipment includes, but is in no way limited to, devices such as mobile stations, routers, handheld computers, digital assistants, mobile cellular devices, and similar devices recognized by one skilled in the art.

The user equipment activates the radio frequency assistant to receive radio frequency signals through a number of commands that also control the operations of the radio frequency assistant. The radio frequency assistant is activated and controlled by the user equipment to transform a radio frequency signal that is received to a different carrier frequency for transmission. The user equipment determines whether the radio frequency assistant retransmits or repeats the transformed radio frequency signal to a base station or to user equipment. The radio frequency assistant retransmits or repeats a different carrier frequency as determined by the user equipment. The user equipment communicates with the radio frequency assistant over a short-range wireless link that may be activated between the radio frequency assistant and the user equipment to receive or send radio frequency signals.

In the art of communication systems, a wireless link is a communications connection between a number of communication units that transmits and receives radio frequency signals. User equipment, as referenced within this disclosure has the same meaning and functionality as the term “UE”. Radio frequency assistant, as referenced within this disclosure has the same meaning and functionality as the term “Assistant”. Also, in this disclosure, short-range references a distance that in some embodiments may be within the range of about ten meters. A short-range distance depends on the power of the signal being transmitted and the strength of the signal needed for transmission or reception.

The radio frequency assistant may be carried at a short distance from the user equipment. For example, in some embodiments, the distance between the radio frequency assistant and the user equipment may be less than or equal to ten meters. The radio frequency assistant may be carried in close proximity to the user equipment through various implementations. For example, without limitation, the radio frequency assistant may be implemented in a keychain, a key ring, or the holster of a user equipment that is a mobile cellular device to be carried together with the user equipment or at a short range distance from the user equipment.

Turning now to FIG. 1, a top level representation of a two-by-two multiple input multiple output wireless communication system 100 is depicted in accordance with an illustrative embodiment of the disclosure. A user equipment assistant system 102 receives a plurality of radio frequency signals of a single frequency f1 from base station 120 through a plurality of communication channels or paths. In this embodiment, there are four paths, path1_f1 112, path2_f1 114, path3_f1 116 and path4_f1 118. Path1_f1 112, path2_f1 114, path3_f1 116 and path4_f1 118 may transmit on a single frequency, f1, between the user equipment assistant system 102 and the base station 120. The transmission may be an uplink communication transmission to base station 120 from user equipment 102 or a downlink communication transmission from base station 120 to user equipment 102. In the illustrative examples, the number of paths is not limited to the illustrated paths and may include any number of communication paths as may be known to one skilled in the art.

As depicted, user equipment assistant system 102 includes two antenna elements, UA1 108C and UA2 106C. Antenna UA1 108C and antenna UA2 106C are spaced or separated from each other by a distance D 104. The spacing between UA1 108C and UA2 106C should be sufficient to provide independent transmit and receive transmission paths and sufficiently reduce any correlation or interference between UA1 108C and UA2 106C. The spatial separation of distance D 104 represents an optimum separation distance of approximately $$\frac{\lambda}{2}$$

or more, where lambda, λ, is the wavelength of the carrier radio wave.

In a downlink communication transmission, base station 120 may transmit a radio signal of frequency f1 over base station antennas BA1 122 and BA2 124. Base station antenna 122 and base station antenna 124 may be configured as a single antenna or a plurality or bank of antennas. Radio signal frequency f1 is received by user equipment assistant system 102 through multiple paths over antenna UA1 108C and UA2 106C of user equipment assistant system 102.

In an embodiment of a downlink communication transmission, a radio frequency signal transmits over path1_f1 112 from antenna BA1 122 on base station 120 directly to antenna UA1 108C on user equipment 108. A radio frequency signal transmits over path3_f1 116 from antenna BA1 122 on base station 120 directly to antenna UA2 106C on radio frequency assistant 106. Additionally, the path2_f1 114 radio frequency signal transmits from antenna BA2 124 directly to antenna UA1 108C on user equipment 108. Path4_f1 118 radio frequency signal transmits from antenna BA2 124 on base station 120 directly to antenna UA2 106C on radio frequency assistant 106. User equipment 108 may enable the operation of radio frequency assistant 106 of user equipment assistant system 102 to transform or transform the radio frequency signal over path3_f1 116 to a second radio frequency signal, f2, that transmits between antenna AM2 106B and antenna AM1 108B over a short range wireless link, path5_f2 110, directly to user equipment 108.

As depicted, antenna AM1 108B is internal to the user equipment assistant system 102 and functions to enable the wireless link, path5_f2 110. In an embodiment, antenna UA1 108C and antenna AM1 108B may be a single antenna.

In an uplink communication transmission, user equipment assistant system 102 may transmit a signal of frequency f1 to base station antennas BA1 122 and BA2 124 of base station 120 over multiple paths. In an embodiment, the user equipment assistant system 102 may transmit the signal over path2_f1 114 and path4_f1 118 to antenna BA2 124 on the base station 120 and over path3_f1 116 and path1_f1 112 to antenna BA1 122 on the base station 120. User equipment 108 may enable the operation of radio frequency assistant 106 to transmit the signals path3_f1 116 and path4_f1 118. The assistant 106 will transform a signal from a wireless short range channel path5_f2 110 and transmit the signal at frequency f1, over path3_f1 116 and path4_f1 118.

Figure 2:
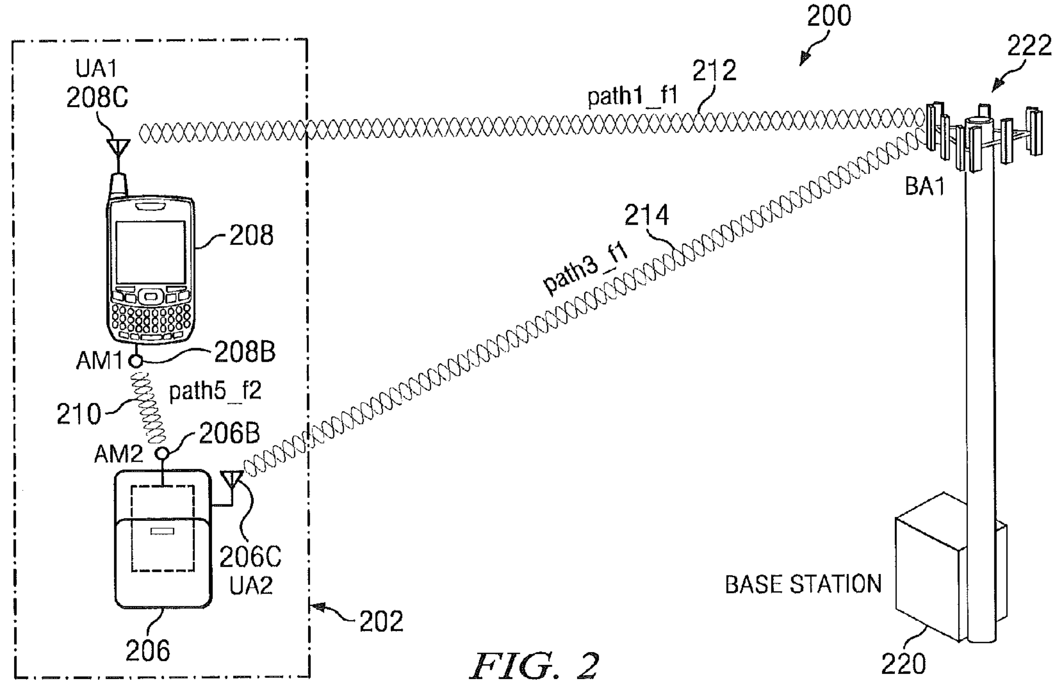
FIG. 2 is a top level diagram of a one-by-two multiple input multiple output wireless communication system that is a variation of FIG. 1 in accordance with an illustrative embodiment of the disclosure.

Turning now to FIG. 2, a top level diagram of a one-by-two multiple input multiple output wireless communication system 200 is depicted in accordance with an illustrative embodiment of the disclosure. In a one-by-two multiple input multiple output communication system, there are two antennas on one side and one antenna on the other side of a transmission. Multiple antennas are used on either of the receiver or the transmitter but not both the receiver and transmitter of a two-way communication. In multiple input multiple output wireless communication system 200, the downlink data transmission is a communication transmission from base station 220 transmits to user equipment assistant system 202. The uplink data transmission is a communication transmission from user equipment assistant system 202 to base station 220.

In an illustrative embodiment, the downlink data transmission may use one transmitting antenna at the base station 220, antenna BA1 222, and two receiving antennas at the user equipment assistant system 202, antenna UA1 208C and antenna UA2 206C. Base station antenna BA1 222 may be a single antenna or a plurality or bank of antennas. The uplink data transmission may use one transmitting antenna on the user equipment assistant system, antenna UA1 208C, and one receiving antenna on the base station, antenna BA1 222.

In another illustrative embodiment, the uplink data transmission may use two transmitting antennas on the user equipment assistant system antenna UA1 208C and antenna UA2 206C and one receiving antenna on the base station antenna BA1 222 to achieve some performance benefit from transmit diversity. Performance benefits may include, but is in no way limited to lower error rate, increased data rate or capacity of wireless communications systems, increased propagation distance or range of the wireless communications system, and reduced signal interference.

For example, antenna UA1 208C may transmit signals over path1_f1 212 and antenna UA2 206C may transmit signals over path3_f1 214. Interference on either or both transmission paths, such as path1_f1 212 and path3_f1 214, may cause fading on the selected path or reduce the efficiency of transmission if only one path is transmitting the signal frequency.

In an illustrative embodiment, antenna UA1 208C and antenna UA2 206C may be dynamically selected. In another illustrative embodiment, antenna UA1 208C and antenna UA2 206C may be used at the same time. In another illustrative embodiment, it may also be possible to switch or toggle between antenna UA1 208C and antenna UA2 206C to overcome potential fading and increase the signal frequency transmission, as needed.

In all the illustrative embodiments referenced, user equipment 208 may enable the operation of antenna UA2 206C of radio frequency assistant 206 for transmission of signals across signal path path3_f1 214. In an uplink transmission, the radio frequency assistant 206 transforms a signal and retransmits or repeats the transformed signal over a wireless short range link, path5_f2 210. The radio frequency assistant 206 retransmits or repeats the transformed signal at a different frequency over the signal path, path3_f1 214.

In operation, base station 220 may transmit a single frequency over multiple independent paths to multiple antennas at user equipment assistant system 202 in a downlink transmission. A frequency signal f1 may be transmitted from base station 220 over path1_f1 212 and path3_f1 214 to antenna UA1 208C of user equipment 208 and antenna UA2 206C of radio frequency assistant 206. User equipment 208 may enable operation of radio frequency assistant 206 to transform the signal f1 received at antenna UA2 206C to a signal f2. User equipment 208 retransmits or repeats the transformed signal f2 over a short range wireless link, path5_f2 210. For illustrative purposes only, as depicted, radio frequency transmissions over wireless link, path5_f2 210, between user equipment 208 and radio frequency assistant 206, are enabled by antenna AM1 208B and antenna AM2 206B.

As depicted, antenna AM1 208B is internal to the user equipment assistant system 202 and functions to enable the wireless link, path5_f2 210. In an embodiment, antenna UA1 208C and antenna AM1 208B may be a single antenna.

Figure 3:
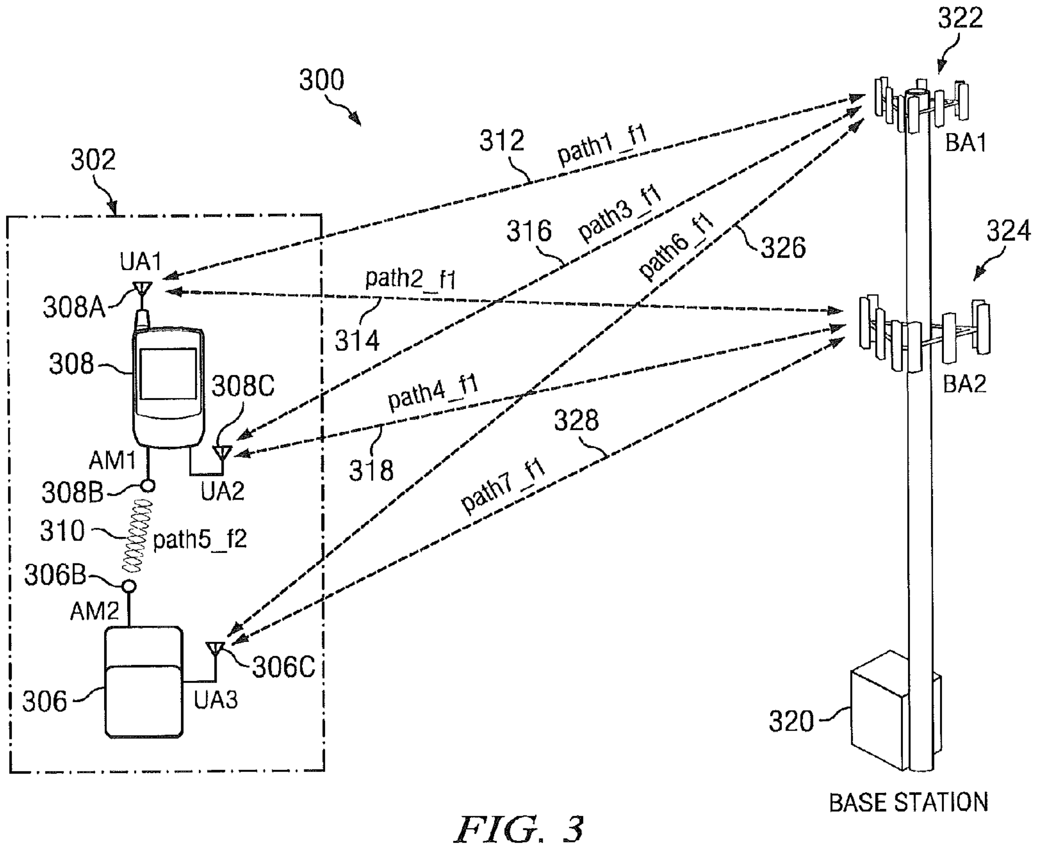
FIG. 3 is a top level system diagram of a two-by-two multiple input multiple output wireless communication system that is a variation of FIG. 1 in accordance with an illustrative embodiment of the disclosure.

Turning now to FIG. 3, a top level system diagram 300 of a two-by-two multiple input multiple output wireless communication system in accordance with an illustrative embodiment of the disclosure is disclosed. In the depicted example, user equipment assistant system 302 includes user equipment 308 and radio frequency assistant 306. Although radio frequency assistant 306 may be present in user equipment assistant system 302, it may be optionally enabled by user equipment 308. User equipment 308 selectively enables the use of radio frequency assistant 306.

In one embodiment, user equipment 308 includes the functionality of radio frequency assistant 306 and increase antenna diversity and power by including a number of antennas, such as antenna UA1 308A and UA2 308C that are capable of transmitting and receiving radio frequency signals simultaneously across a plurality of paths, such as path1_f1 312, path2_f1 314, path3_f1 316, and path4_f1 318. As used within this disclosure, "a number of" refers to one or more items.

User equipment 308 may selectively determine whether to activate or deactivate the use of radio frequency assistant 306. In an illustrative embodiment, user equipment 308 activates radio frequency assistant 306 whenever it receives radio frequency signal. In another embodiment, user equipment 308 may activate and deactivate radio frequency assistant 306 approximately every millisecond or on a per subframe basis. Other embodiments may be recognized by one skilled in the art.

The determination to selectively activate or deactivate radio frequency assistant 306 may be based on whether processing of the user equipment indicates that enabling of the assistant is necessary, advantageous or possible. For example, without limitation, user equipment 308 may deactivate the use of radio frequency assistant 306 when the radio frequency assistant 306 is not present, when the radio frequency assistant is not functional, or to increase battery life of the user equipment 308 or the radio frequency assistant 306.

Conversely, for example, without limitation, user equipment 308 may activate the use of radio frequency assistant 306 when user equipment determines that a radio frequency signal is not being transmitted with sufficient power, or battery life or battery saving is not an important issue. Other scenarios or embodiments that would result in the selective enablement of the radio frequency assistant would be recognized by one skilled in the art.

In an embodiment where the user equipment 308 selectively activates radio frequency assistant 306, radio frequency assistant 306 will receive radio frequency signals over antenna UA3 306C. User equipment 308 controls radio frequency assistant 306 with commands that enable the radio frequency assistant 306 to transform the frequency of a radio frequency signal received on antenna UA3 306C to a different frequency. Radio frequency assistant 306 retransmits or repeats the transformed frequency to user equipment 308. In embodiments where the radio frequency assistant 306 is not activated or used, user equipment 308 implements the functionality of radio frequency assistant 306 and receives and processes all radio wave signals.

In an embodiment of top level system diagram 300, radio frequency assistant 306 is deactivated or disabled in the user equipment assistant system 302. Disabling radio frequency assistant 306 disables antenna UA3 306C. In a downlink transmission, antenna BA1 322 of base station 320 transmits a radio wave of a first frequency, f1, to user equipment antenna UA1 308A over path1_f1 312 and to user equipment antenna UA2 308C over path3_f1 316. Similarly, base station antenna BA2 324 transmits a radio wave of frequency f1 to user equipment antenna UA1 308A over path2_f1 314 and to user equipment antenna UA2 308C across signal path4_f1 318. Base station antenna BA1 322 and base station antenna BA2 324 may transmit the same data to user equipment antenna UA1 308A and antenna UA2 308C or different data may be transmitted.

In an uplink transmission, user equipment antenna UA1 308A sends data in a radio wave of frequency f1 to base station antenna BA1 322 over path1_f1 312 and to base station antenna BA2 324 over path2_f1 314. User equipment antenna UA2 308C may send the same data as user equipment antenna UA1 308A or different data to base station antenna BA1 322 over path3_f1 316 and base station antenna BA2 324 over path4_f1 318.

In an embodiment of the depicted example of top level system diagram 300, radio frequency assistant 306 is activated or enabled in the user equipment system 302 by user equipment 308. In a downlink transmission, enabling assistant 306 results in the disabling of user equipment antenna UA2 308C as a receiver for radio wave signals from base station 320 across signal paths, path3_f1 316 and path4_f1 318. Instead of user equipment antenna UA2 308C receiving radio wave signals, antenna UA3 306C of enabled assistant 306 receives signals transmitted at a first radio frequency from base station antenna BA1 322 over path6_f1 326 and from BA2 324 of base station 320 over path7_f1 328. Radio frequency assistant 306 transforms the received signals to a second and different frequency, f2, and transmits the transformed signal to user equipment 308 across wireless links AM2 306B and AM1 308B.

Similarly, in an uplink transmission, enabling radio frequency assistant 306 results in the disabling of user equipment antenna UA2 308C as a transmitter for radio frequency signals to the base station 320. Instead of user equipment antenna UA2 308C transmitting radio wave signals to base station 320, the radio wave signals are transmitted using a second frequency, f2, over short range wireless link, path5_f2 310. Antenna AM1 308B and antenna AM2 306B function to enable the wireless link, path5_f2 310. The radio frequency assistant 306 then transforms these signals to a first frequency f1 for transmission to the base station 320 over path6_f1 326 and path7_f1 328.

The illustration of FIG. 1 through FIG. 3 is not meant to imply physical or architectural limitations to the manner in which different advantageous embodiments may be implemented. In addition to the components illustrated, other components may be used in addition to or in place of the components illustrated. Some components may be unnecessary in some advantageous embodiments.

Figure 4:
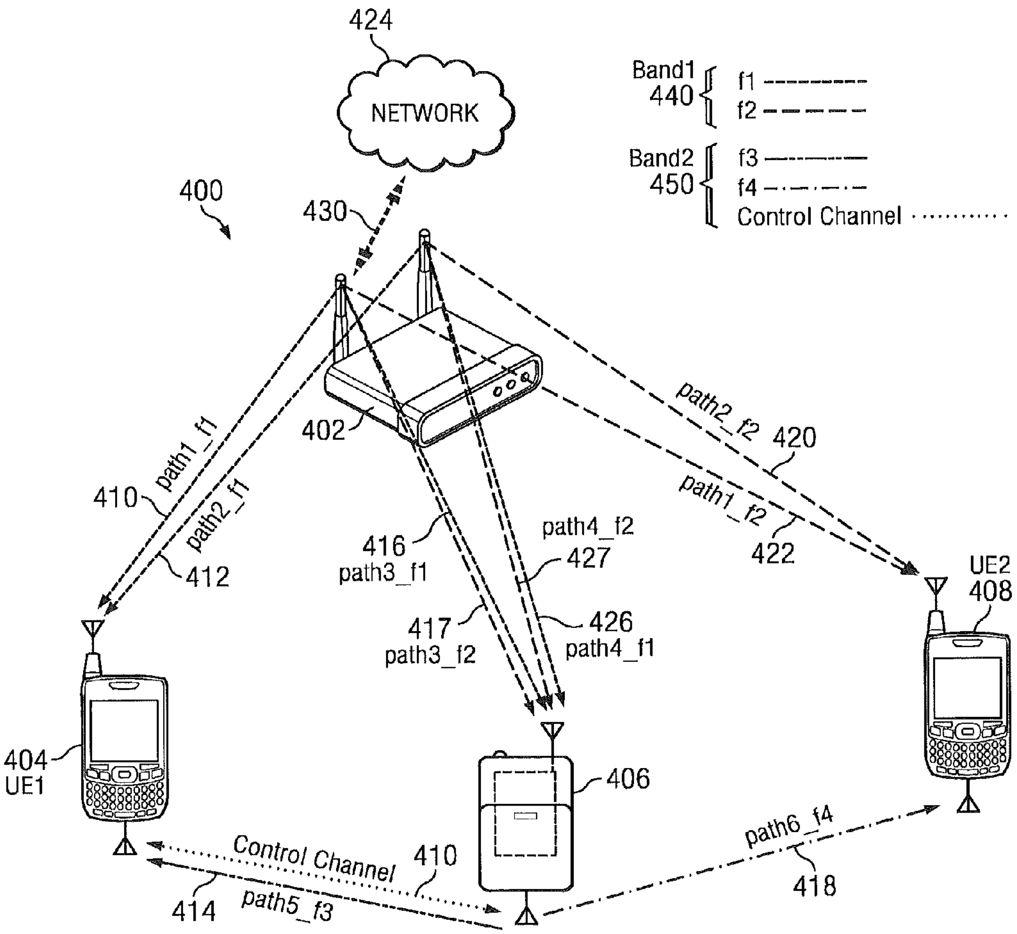
FIG. 4 is an illustration of a communication system that may implement an alternate embodiment in accordance with an illustrative embodiment of the disclosure.

Referring now to FIG. 4, an illustration of a communication system 400 that may implement an alternate embodiment of FIG. 1 in accordance with an illustrative embodiment of the disclosure is depicted. In the depicted example, the user equipment assistant system is expanded to include a number of user equipment and a single assistant that may be configured through a network to operate with a number of different user equipment. Although the radio frequency assistant is configured to operate with a single user equipment, the radio frequency assistant may also be reconfigured to retransmit a signal corresponding to other user equipment. As used herein in this disclosure, "a number of" refers to one or more items.

For example, in FIG. 4, a base station, such as base station 120 of FIG. 1, is represented by wireless local area router 402. In this illustrative embodiment, two frequency bands, band1 440 and band2 450 are illustrated. However, one skilled in the art would recognize that the number of bands is not limited to the number of bands illustrated. The number of bands may vary in alternative embodiments based on implementation. A band is a contiguous set of frequencies. For example, a contiguous set or range of frequencies from 1900 megahertz (MHz) to 1980 MHz represents the set of frequencies in a 1900 megahertz (MHz) band.

In the depicted embodiment, Band1 440 includes a first frequency, f1, and a second frequency, f2. Band2 450 includes a third frequency, f3, a fourth frequency, f4, and a control channel frequency. Wireless local area router 402 allocates frequency 1 of band1 440 to user equipment 1, UE1 404 and allocates frequency 2 of band2 450 to user equipment 2, UE2 408.

In an illustrative embodiment, network 424 may assign a unique identification to radio frequency assistant 406 through wireless router 402 that pairs radio frequency assistant 406 with for operation with user equipment 1, UE1 404 in system 400. The unique identification may be, for example, without limitation, a number, a code, or other identifier known to one skilled in the art. Commands and instructions are sent between user equipment UE1 404 and paired radio frequency assistant 406 over control channels located respectively in user equipment UE1 404 and radio frequency assistant 406, represented here as a single control channel 410.

Wireless router 402 may transmit a signal at frequency 1 over signal path1_f1 410 and signal path2_f1 412 to user equipment 1 UE1 404 and over signal path3_f1 416 and signal path4_f1 426 to the radio frequency assistant 406. Radio frequency assistant 406 uses band2 450 to retransmit signals. Radio frequency assistant 406 retransmits the first frequency, f1, over signal path5_f3 414 to user equipment UE1 404.

In another illustrative embodiment, wireless local area router 402 allocates frequency 2 of band1 440 to user equipment 2 UE2 408. Wireless router 402 may also transmit a frequency 2 over signal path1_f2 422 and path2_f2 420 to user equipment 2 UE2 408 and over path3_f2 417 and path4_f2 427 to the radio frequency assistant 406.

Network 424 may transmit a request wirelessly over path 430 for user equipment UE1 404 to configure radio frequency assistant 406 to retransmit frequency 2 to user equipment 2, UE2 408. Radio frequency assistant 406 receives frequency 2 on path3_f2 417 and path4_f2 427 and retransmits a signal of frequency 2 as a signal of frequency 4 across path6_f4 418.

These depicted examples illustrate the implementation of only a downlink transmission from a base station, such as wireless local area router 402, to user equipment, such as UE1 404. However, the implementation is not limited to downlink transmissions and may also be applicable to uplink transmissions or transmissions from user equipment to a base station, as would be recognized by one skilled in the art.

The illustration of FIG. 4 is not meant to imply physical or architectural limitations to the manner in which different advantageous embodiments may be implemented. In an advantageous embodiment, for example, without limitation, a plurality of radio frequency assistants may be activated and controlled by one or more user equipment.

Additionally, In addition to the components illustrated, other components may be used in addition to or in place of the components illustrated. Some components may be unnecessary in some advantageous embodiments. Also, the blocks are presented to illustrate functional components. One or more of these blocks may be combined into different blocks, divided into different blocks, or both combined and divided into different blocks when implemented in different advantageous embodiments.

Figure 5:
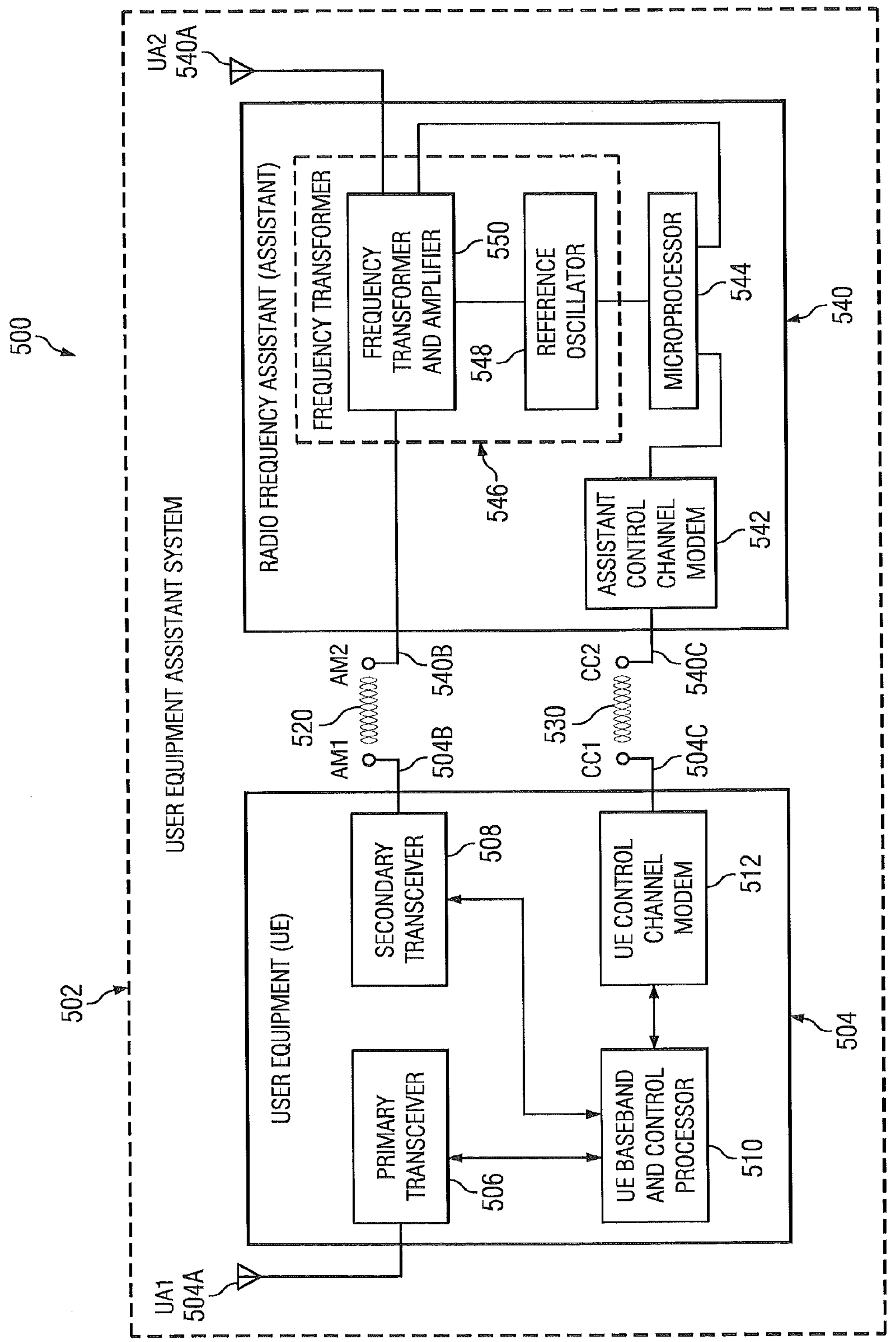
FIG. 5 is a block diagram of a user equipment assistant system in accordance with an illustrative embodiment of the disclosure.

In FIG. 5, a detailed block diagram 500 of the user equipment assistant system is depicted in accordance with an illustrative embodiment of the disclosure. In detailed block diagram 500, user equipment assistant system 502 is an example of one implementation of user equipment assistant system 102 as illustrated in multiple input multiple output wireless communication system 100.

As illustrated, user equipment assistant system 502 includes components that function as terminal devices within a communications system, such as communication system 100. In this illustrative embodiment, user equipment assistant system 502 includes user equipment 504 and radio frequency assistant 540. User equipment 504 may include wireless devices, for example, without limitation, a mobile phone, a smart phone, a laptop computer, a personal digital assistant or other such wireless mobile device as may be known to one skilled in the art.

User equipment assistant system 502 includes at least two antennas, antenna UA1 504A and antenna UA2 540A. Antenna UA1 504A is coupled to user equipment 504 to facilitate wireless communications that include transmitting and receiving radio frequency signals from an external network (not shown) or base station (not shown). Antenna UA2 540A is coupled to radio frequency assistant 540 to enable wireless communications, including transmitting and receiving radio frequency signals. A radio frequency signal may be received or transmitted through antenna UA1 504A and processed through primary transceiver 506. Primary transceiver 506 communicates with an external network through antenna UA1 504A. In some embodiments, the external network may be a cellular network such as a Global System for Mobile communications (GSM) network or other wireless communications network known to one skilled in the art. For example, a radio frequency signal may be transmitted from a base station, such as base station 120 in FIG. 1.

In a downlink data transmission, antenna UA1 504A of user equipment 504 and antenna UA2 540A of radio frequency assistant 540 are configured to receive the radio frequency signal transmission from a base station. Primary transceiver 506 processes the radio frequency signal received from the base station (not shown) through the UE baseband and control processor 510. User equipment 504 may enable radio frequency assistant 540 to process the radio frequency signal received over antenna UA2 540A through frequency transformer 546.

Frequency transformer 546 may include frequency transformer and amplifier 550 and a reference oscillator 548 that is an internal unit of the frequency transformer 546. In some embodiments, a reference oscillator 548 external to the frequency transformer 546 may be used. The frequency transformer and amplifier 550 transforms the radio frequency signal to a second and different radio frequency signal. The transformed signal is wirelessly communicated from the radio frequency assistant 540 to secondary transceiver 508 of user equipment 504. Secondary transceiver 508 of user equipment 504 communicates with the radio frequency assistant 540 over wireless link 520 between antenna AM1 504B and antenna AM2 540B. Secondary transceiver 508 receives the radio frequency signals sent to user equipment assistant system 502 and transformed by the frequency transformer 546 of radio frequency assistant 540.

The control channel wireless link 530 between antenna CC1 504C and antenna CC2 540C is internal to user equipment assistant system 502 and operates between user equipment 504 and radio frequency assistant 540 to enable user equipment 504 to send commands to control the operation of radio frequency assistant 540. The UE baseband and control processor 510 of user equipment 504 may issue or send a number of operational commands across control channel wireless link 530 to radio frequency assistant 540 that are processed by microprocessor 544. The microprocessor 544 may process commands that enable frequency transformer and amplifier 550 and reference oscillator 548 as may be required by the user equipment 504 to transform a radio frequency signal that may be processed through antenna UA2 540A.

For example, user equipment 504 may send a power_off signal or command that is processed by the UE baseband and control processor 510. The processed command is sent from the UE baseband and control processor 510 to the UE control channel modem 512. UE control channel modem 512 wirelessly issues the power_off signal or command over wireless link 530 between antenna CC1 504C and antenna CC2 540C to turn on radio frequency assistant 540. Assistant control channel modem 542 receives the power_off command and sends the power_off command to microprocessor 544. Microprocessor 544 executes the command and turns off the frequency transformer 546 and other operations of the radio frequency assistant 540.

In one or more advantageous embodiments of this disclosure, antenna CC1 504C and antenna AM1 504B may function as a single antenna that receives and transmits signals. Alternatively, in one or more illustrative embodiments of this disclosure, antenna CC1 504C, antenna AM1 504B and antenna UA1 504A may function as a single antenna that receives and transmits signals.

Additionally, in one or more advantageous embodiments of this disclosure, antenna CC2 540C and antenna AM2 540B may function as a single antenna that receives and transmits signals. Alternatively, in one or more illustrative embodiments of this disclosure, antenna CC2 540C, antenna AM2 540B and antenna UA2 540A may function as a single antenna that receives and transmits signals.

In these depicted examples, the user equipment 504 may issue a number of different commands, in addition to the power_off command, to enable and control the radio frequency assistant 540. The commands are wirelessly communicated from UE control channel modem 512 through assistant control channel modem 542 to microprocessor 544. Microprocessor 544 is coupled to assistant control channel modem 542 to receive commands from the UE control channel modem 512 of user equipment 504. Microprocessor 544 controls frequency transformer and amplifier 550 to format and process commands and events such as change frequency, change gain, turn on, turn off and other such commands and events as will be described further in this disclosure.

The assistant control channel modem 542 regulates the communication transmissions between user equipment 504 and radio frequency assistant 540. The communication transmissions include the sending and receiving of information, such as, without limitation, commands, radio frequency signals, and status messages between user equipment 504 and radio frequency assistant 540. Microprocessor 544 receives the commands and radio frequency signals and adjusts the gain, frequency or power state of the frequency transformer and amplifier 550. The microprocessor adjusts the reference frequency through reference oscillator 548. Reference oscillator 548 provides the reference frequency for the frequency transformer and amplifier 550 that determines the transformation of the radio frequency signals from a first band to a different second band.

Frequency transformer 546 may include reference oscillator 548. In an advantageous embodiment, the frequency transformer and amplifier 550 may function together with the reference oscillator 548 as a single physical unit, such as frequency transformer 546. In other embodiments, reference oscillator 548 may be external to or outside of frequency transformer 546. Microprocessor 544 adjusts the reference frequency through reference oscillator 548. Frequency transformer and amplifier 550 determine how the gain and frequency are transformed from one band to another.

Figure 6:
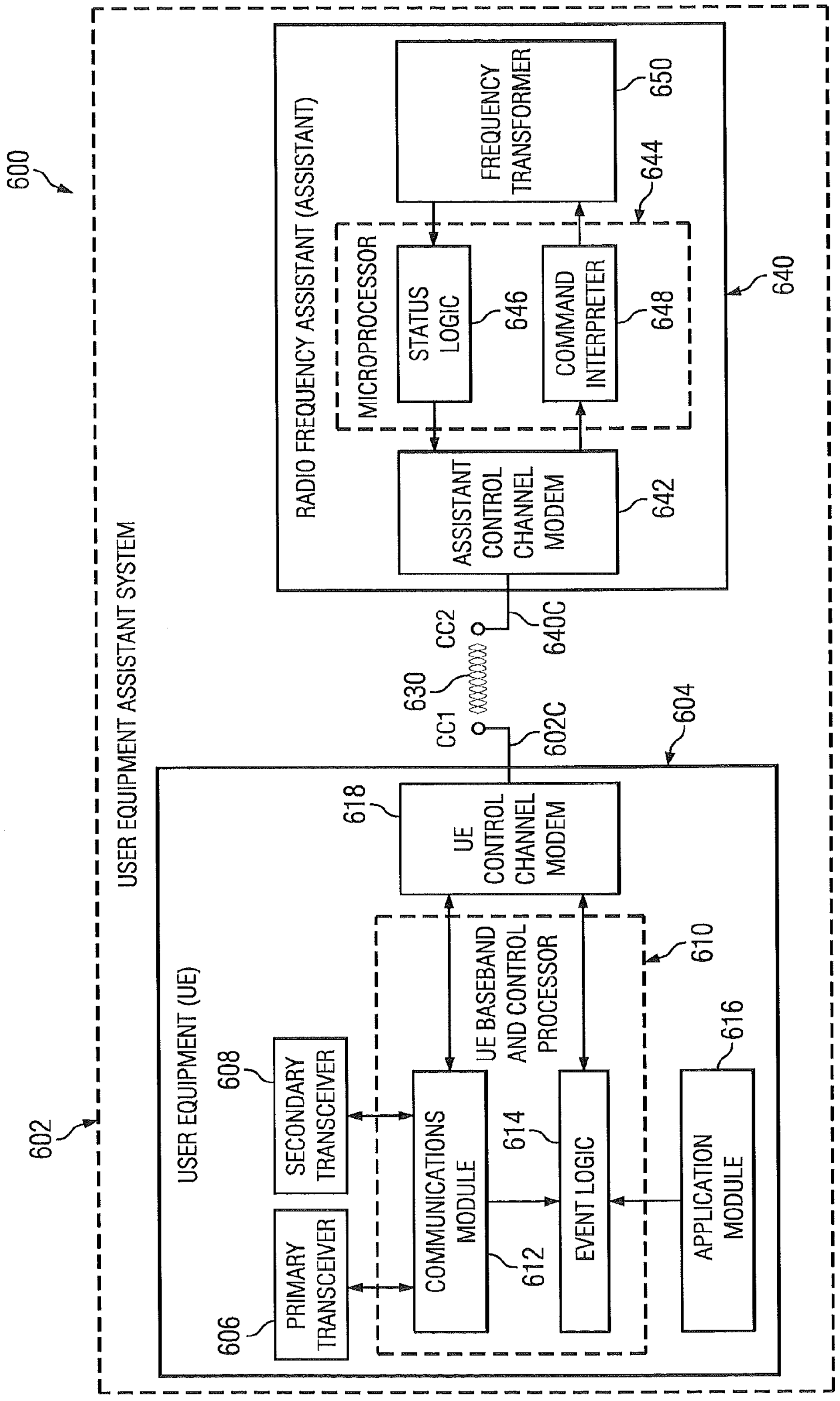
FIG. 6 is a detailed block diagram of the user equipment assistant system illustrated in FIG. 5 in accordance with an illustrative embodiment of the disclosure.

Referring now to FIG. 6, a detailed block diagram 600 of a user equipment assistant system 602 is depicted in accordance with an illustrative embodiment of the disclosure. FIG. 6 illustrates the details of user equipment assistant system 502 as illustrated in FIG. 5. In FIG. 6, user equipment system 602 details the communication of commands between the user equipment 604 and the radio frequency assistant 640.

In FIG. 6, command control messages are processed through UE control channel modem 618 over a wireless link, such as wireless link 630 between antenna CC1 602C and antenna CC2 640C. The UE baseband and control processor 610 may issue a command that gets sent out over wireless link 630 from UE control channel modem 618 to user equipment control channel modem 642. In this illustrative example, the UE baseband and control processor 610 includes communications module 612 and event logic 614.

Application module 616 may generate or input commands or control messages to the UE baseband and control processor 610 Event logic 614 receives commands, control messages, and radio frequency signals from communications module 612 and application module 616 and determines whether to send the commands or control messages to the UE control channel modem 618. The communications module 612 also receives and sends data to and from primary transceiver 606 and secondary transceiver 608. User equipment 604 receives and sends data, commands, and radio frequency signals from UE control channel modem 618 to assistant control channel modem 642 over wireless link 630 between antenna CC1 602C and antenna CC2 640C.

Microprocessor 644 receives the command signals from assistant control channel modem 642 and processes them through command interpreter 648. The commands determine which features of the frequency transformer 650 are active. For example, the commands may activate and control the frequency transformer 650 to perform a gain and frequency adjustment for radio frequency assistant 640 that amplifies and changes the frequency of the radio frequency signal. Microprocessor 644 may acknowledge the processing of each command received from user equipment 604 by sending a status message from status logic 646 over the assistant control channel modem 642. The assistant control channel modem 642 wirelessly communicates the status message to UE control channel modem 618 which communicates the information to the communications module for processing.

Status logic 646 may generate a status message in response to a status command request from user equipment 604. Status logic 646 may also generate the status message automatically based on a trigger such as, without limitation, an event that disables frequency transformer 650, a power on or power off event, or some other command for which the user equipment may require an acknowledgement.

Frequency transformer 650 may include a number of components such as frequency transformer and amplifier 550 and reference oscillator 548 as illustrated in FIG. 5. The microprocessor 644 may control the operational status of the frequency transformer 650. For example, it turns the frequency transformer 650 on and off. Commands from microprocessor 644 to frequency transformer 650 may control adjustments of the reference oscillator inside of the frequency transformer to correct channel, perform signal gain changes, and perform frequency changes.

Figure 7:
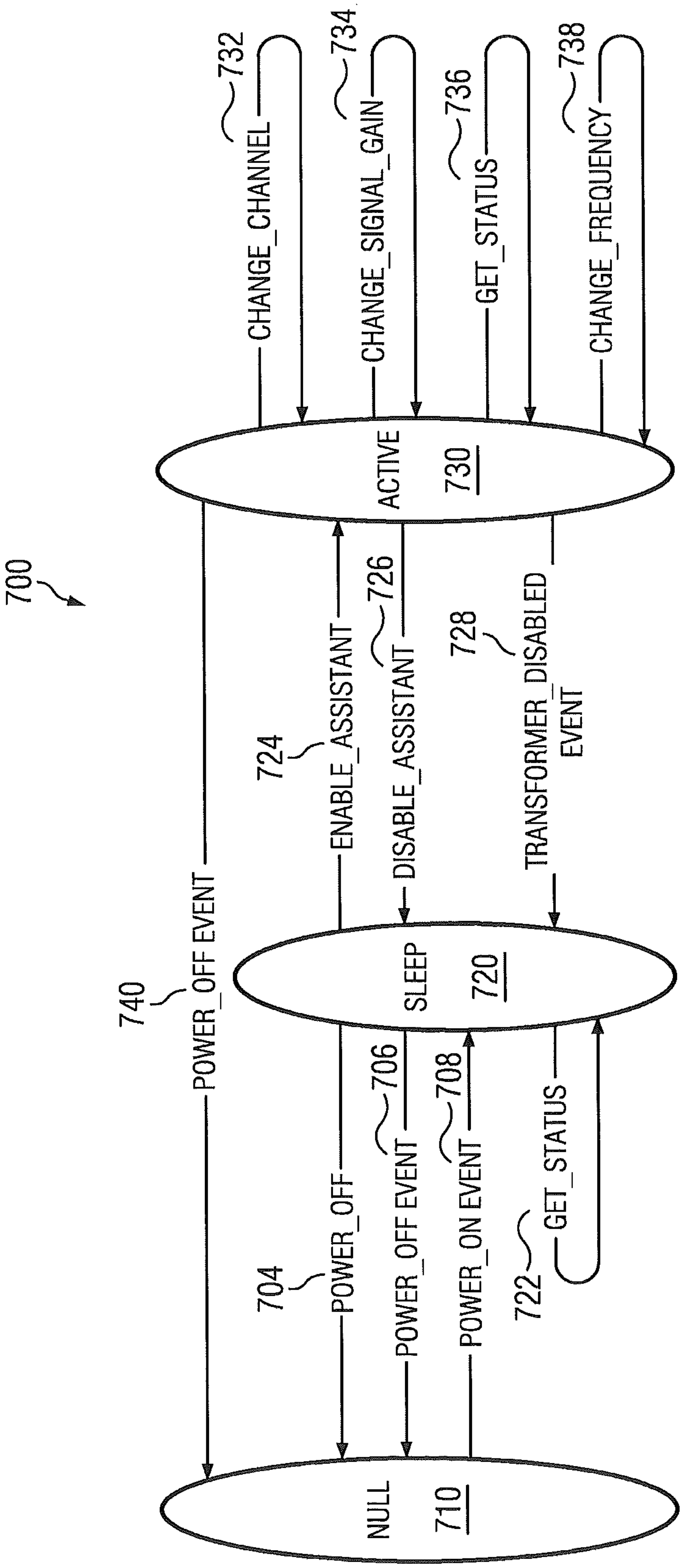
FIG. 7 is a diagram of a state machine of the radio frequency assistant in accordance with an illustrative embodiment of the disclosure.

Turning now to FIG. 7, a diagram 700 of a state machine is depicted in accordance with an illustrative embodiment of the disclosure. In this depicted example, state machine 700 may be implemented for an assistant such as radio frequency assistant (Assistant) 640 in FIG. 6.

As illustrated, state machine 700 illustrates the events that may occur within a radio frequency assistant to transition, change, or maintain the state of the radio frequency assistant. In this illustrative example, the Assistant has three states that are indicated as null 710, sleep 720 and active 730. The null 710 state is the root or initial state from which all subsequent or further actions occur. In the null 710 state, the Assistant has no power and is not operational. In the sleep 720 state, the Assistant is operational and waits to execute a command. In the sleep 720 state, only the control channel modem and microprocessor of the Assistant are on and operational. The frequency transformer of the Assistant is not powered on. The active 730 state indicates that the Assistant is operating and responding to commands as instructed by the microprocessor such as microprocessor 544 of FIG. 5. In the active 730 state, the frequency transformer is operational and actively translating radio frequency (RF) signals.

As illustrated, the arrows represent transitions from one state to another state because of an event. An event may be defined as something that occurs that causes the assistant to transition from one state to another state while certain actions are being executed or causes a reentry of the same state while certain actions are being executed.

Focusing first on the null 710 state of state machine 700 and the transition to and from the null 710 state, in an embodiment, the Assistant is in a non-operational or null 710 state. The Assistant in the null 710 state may not receive or process any commands since the Assistant is off. The Assistant becomes operational after being activated or powered on by a physical occurrence.

For example, without limitation, an external switch on the Assistant may be enabled, a battery may be charged and physically placed into the radio frequency assistant or another such physical action. A power_on 708 event transitions the Assistant from the null 710 state to the sleep 720 state.

Similarly, a power_off event 706 or a power_off 704 command may transition the Assistant from the sleep 720 state to the null 710 state. In sleep 720 state, the Assistant is on and waiting for an event to occur. During the sleep 720 state, the radio frequency assistant control channel modem may be sending and receiving commands and information. A power_off 704 command may be received by the control channel mode. The power_off 704 command transitions the Assistant from the sleep 720 state to the null 710 state.

Similarly, a power_off event 706 in sleep 720 state transitions the assistant from the sleep 720 state to the null 710 state. A power_off event 706 may be a physical occurrence that includes, but is not limited to, actions such as toggling a power switch on the Assistant, removing a battery to disconnect the power source, or other such actions. A power_off event 706 may also occur when the Assistant is in active 730 state to transition the Assistant to null 710 state. In active 730 state, the Assistant is operating and processing commands. A physical event such as powering off the Assistant through a switch or removing a battery source of power in the Assistant would cause the state machine of the Assistant to transition from active 730 state to null 710 state.

Focusing now on the sleep 720 state or mode of state machine 700, the assistant control channel modem is operational and may respond to commands and information that are being received and sent. In sleep 720 state, the Assistant may receive a command to start processing from the user equipment with which it is configured to operate, such as user equipment 604 of FIG. 6.

The enable_assistant 724 command transitions the Assistant from the sleep 720 state to the active 730 state. In the active 730 state, the frequency transformer is on and processes any signals being transmitted. In some embodiments, the frequency transformer processes the signals by translating the signals from a first frequency to a second frequency. In another embodiment, the frequency transformer may process the signals by adjusting the gain of a signal The Assistant transitions from active 730 state to sleep 720 state on receiving a disable_assistant 726 command.

A failure of the microprocessor in the Assistant to activate the frequency transformer, amplifier and reference oscillator will trigger a transformer_disabled 728 event that transitions the Assistant to the sleep 720 state from the active 730 state. The Assistant acknowledges all commands sent from the user equipment to the Assistant. For example, without limitation, the user equipment may send a get_status 736 command to the Assistant in the active 730 state. The Assistant acknowledges the get_status 736 command by sending a status message back to the user equipment and remaining in its existing active 730 state.

In sleep state 720, the Assistant may also receive a get_status 722 command that is sent from the user equipment. In response to the get_status 722 command, the assistant provides its operating status to the user equipment and remains in the sleep 720 state. The status message may include information that may be useful to the user equipment, such as, without limitation, the amount of battery power remaining for the Assistant, the strength or amount of radio frequency power detected at the antenna of the Assistant and other such information that would be known to one skilled in the art.

Turning now to the active 730 state, the control channel modem of the assistant in this state is receiving and processing radio frequency signals, commands, and information through a microprocessor, such as microprocessor 644 of FIG. 6. Processing may include, without limitation, the translation of radio frequency signals by the frequency transformer. Specifically, a frequency transformer and amplifier block within the frequency transformer may transform a first frequency to a second frequency, adjust the gain level of the frequency transformer, and other such actions known to one skilled in the art.

In the active 730 state, a change_channel 732 command may be sent to the Assistant. A channel is a specific frequency allocation within a band. A channel may also be referred to as a radio frequency signal. The user equipment will occasionally change frequency channels. The change_channel 732 command is sent by the user equipment to set the operating frequency of the Assistant to the same operating frequency and radio frequency band or channel as the user equipment. The change_channel 732 command is used for large frequency changes. For example, large frequency changes may refer to steps in a channel frequency allocation for a given band which may be adjustments of approximately 200 kiloHertz (kHz) or more. The Assistant remains in the active 730 state after processing the change_channel 732 command.

In the active 730 state, the user equipment may send a change_signal_gain 734 command to the Assistant to adjust the ability of the frequency transformer, amplifier and reference oscillator to process an incoming signal of a particular power level that is also being processed by the user equipment. The Assistant remains in the active 730 state after processing the change_signal_gain 734 command.

In the active 730 state, a change_frequency 738 command may also be sent by the user equipment to adjust the reference frequency of the Assistant. The Assistant may maintain a reference frequency that is separate from the reference frequency of the base station and user equipment. The reference frequency of the Assistant may need to be adjusted by the user equipment so that it is within the same frequency tolerance that is required of the user equipment. The reference frequency of the Assistant may be adjusted through the frequency transformer.

The change_frequency 738 command is used for small frequency adjustments between the user equipment and the Assistant. For example, a small frequency offset of approximately 500 Hertz (Hz) or less between the Assistant and the user equipment may be detected by the baseband and control processor. In response, the user equipment may send the change_frequency 738 command to the assistant to adjust the frequency. The Assistant remains in the active 730 state after processing the change_frequency 738 command.

In FIG. 8, a diagram of a state table 800 that provides details of the state machine of the radio frequency assistant (Assistant) of FIG. 5 in accordance with an illustrative embodiment of the disclosure is illustrated. In this depicted example, the state table of the Assistant illustrates three major states as NULL 810 state, SLEEP 820 state and ACTIVE 830 state.

The state table 800 depicts ten commands or events which are actions or procedures that occur to cause a change of state of the Assistant. The term IGNORE 860 indicates that a state does not recognize a command or event and therefore no changes of state or actions associated with the change of state occurs. In these depicted examples, the number of states, commands, and events as illustrated in FIG. 8 are implementation dependent and are not limited to the number of states and events illustrated.

The commands are, without limitation, ENABLE_ASSISTANT 846, CHANGE_CHANNEL 848, GET_STATUS 852, POWER_OFF 840, CHANGE_SIGNAL 850, CHANGE_FREQUENCY 854, DISABLE_ASSISTANT 856 and TRANSFORMER_DISABLED 858. The events are, without limitation, POWER_OFF EVENT 842 and POWER_ON EVENT 844.

In the NULL 810 state or mode, the control channel modem of the Assistant is off and cannot process or respond to any commands. Therefore, any command that requires processing through the Assistant control channel modem is ignored or disregarded. In the NULL 810 state or mode, the Assistant responds to a POWER_ON EVENT 844. A POWER_ON EVENT 844 may be a button or switch on the Assistant being toggled or flipped on. A POWER_ON EVENT 844 may also occur, for example, upon a fully charged battery being placed or installed within the Assistant. The POWER_ON EVENT 844 turns the Assistant on to an operational state capable of processing all commands and events through its control channel modem. The POWER_ON EVENT 844 transitions the Assistant to SLEEP 820 state.

Referring now to SLEEP 820 state, a power off command, POWER_OFF 840 and power off event, POWER_OFF EVENT 842 turns the Assistant off and transitions the state machine of the Assistant from SLEEP 820 to NULL 810. In SLEEP 820 state, the microprocessor of the Assistant may be operational in a low, slow duty cycle mode. The microprocessor may check the assistant control channel modem at periodic intervals to determine whether a command or message exists that requires the Assistant to begin receiving and transforming radio frequency signals.

For example, an ENABLE_ASSISTANT 846 command received by the Assistant control channel modem may cause the microprocessor to perform the action of activate frequency transformer 868 to enable the receiving and transformation of radio frequency signals to the Assistant. The ENABLE_ASSISTANT 846 command transitions the Assistant from SLEEP 820 state to ACTIVE 830 state.

The Assistant may automatically send an acknowledgement of each command received and processed by the Assistant control channel modem. The user equipment may also send a GET_STATUS 852 command to check the state of the Assistant. GET_STATUS 852 command is processed through the Assistant control channel modem and causes the microprocessor to perform a send status message 870 action. Send status message 870 sends the current status of the assistant state machine back to the user equipment. The Assistant remains in the current state after execution of a send status message 870 action. For example, in SLEEP 820 state, the send status message 870 action would cause the Assistant to remain in the SLEEP 820 state. In ACTIVE 830 state, the send status message 870 action would cause the Assistant to remain in the ACTIVE 830 state.

In the ACTIVE 830 state, the assistant control channel modem receives commands and information from the user equipment for processing by the microprocessor of the Assistant. In ACTIVE 830 state a POWER_OFF EVENT 842 causes the microprocessor to perform the action of turn assistant off 864 to turn off the Assistant. POWER_OFF EVENT 842 transitions the Assistant to the NULL 810 state. The turn assistant off 864 action disables the assistant channel control modem from receiving any commands or information.

In ACTIVE 830 state, a CHANGE_CHANNEL 848 command causes the microprocessor to perform the action of adjust frequency transformer channel 880. The microprocessor may change the channel by adjusting the frequency of the frequency transformer. The Assistant remains in the ACTIVE 830 state upon completion of the microprocessor action adjust frequency transformer 870.

A change_signal_gain 850 command causes the microprocessor to adjust the gain level of the frequency transformer 876. Specifically, in the frequency transformer, the microprocessor tunes the level of the frequency transformer and amplifier to transmit a signal at a specified power level. The Assistant remains in the ACTIVE 830 state upon completion of the microprocessor action of activate frequency transformer 876.

CHANGE_FREQUENCY 854 command causes the microprocessor to adjust the reference oscillator frequency of the frequency transformer. The Assistant remains in the ACTIVE 830 state upon completion of the action of adjust reference oscillator frequency 872.

DISABLE_ASSISTANT 856 command causes the microprocessor to turn off the frequency transformer by performing the action of disable frequency transformer 874. The assistant control channel modem remains ready to receive commands and information as the Assistant transitions from ACTIVE 830 to SLEEP 820 state.

In the active state 830, GET_STATUS 852 command may result in the user equipment receiving a status message that provides information that the frequency transformer is not enabled. For example, ENABLE_ASSISTANT 846 command may be sent from the user equipment through the assistant control channel modem for processing by the microprocessor.

However, in some cases, a TRANSFORMER_DISABLED EVENT 858 may occur. A TRANSFORMER_DISABLED EVENT 858 may occur because the microprocessor fails to perform the action of activate frequency transformer 868. For example, without limitation, the action of activate frequency transformer 868 may occur because the battery level is too low for the transformer to function. In response to this failure, the microprocessor sends transformer disabled status message 878 to communicate the failure of the frequency transformer to activate to the user equipment. The transformer disabled status message 878 may be sent to the user equipment in response to a GET_STATUS 852 command or automatically as a response to the processing of a TRANSFORMER_DISABLED EVENT 858 by the microprocessor. The TRANSFORMER_DISABLED EVENT 858 transitions the Assistant back to the SLEEP 820 state from ACTIVE 830 state.

Figure 9A:
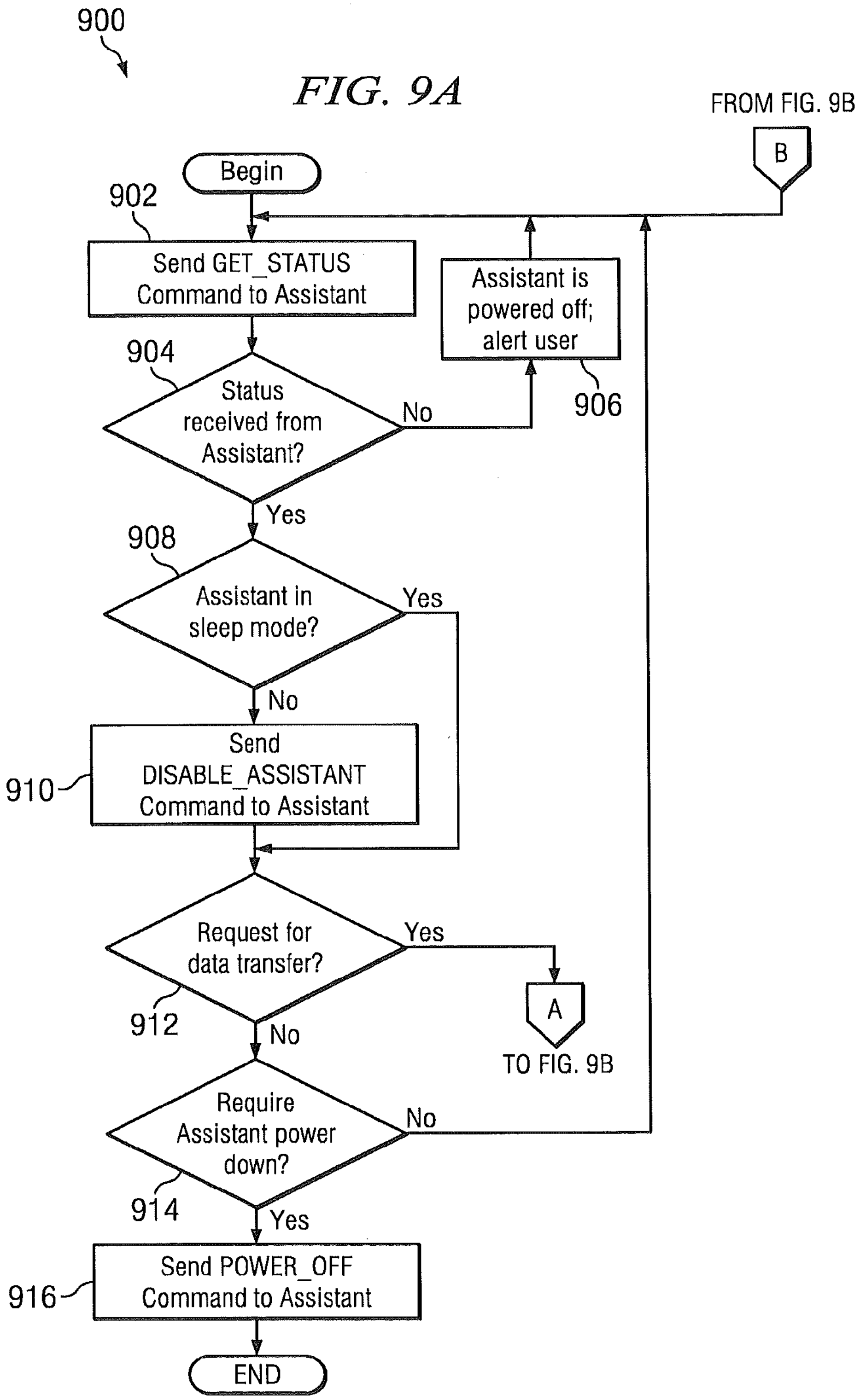
FIG. 9A is a flowchart including the partial views of FIG. 9A, FIG. 9B, and FIG. 9C, that details the operation of a user equipment assistant system in a wireless communication system in accordance with an illustrative embodiment of the disclosure.
Figure 9B:
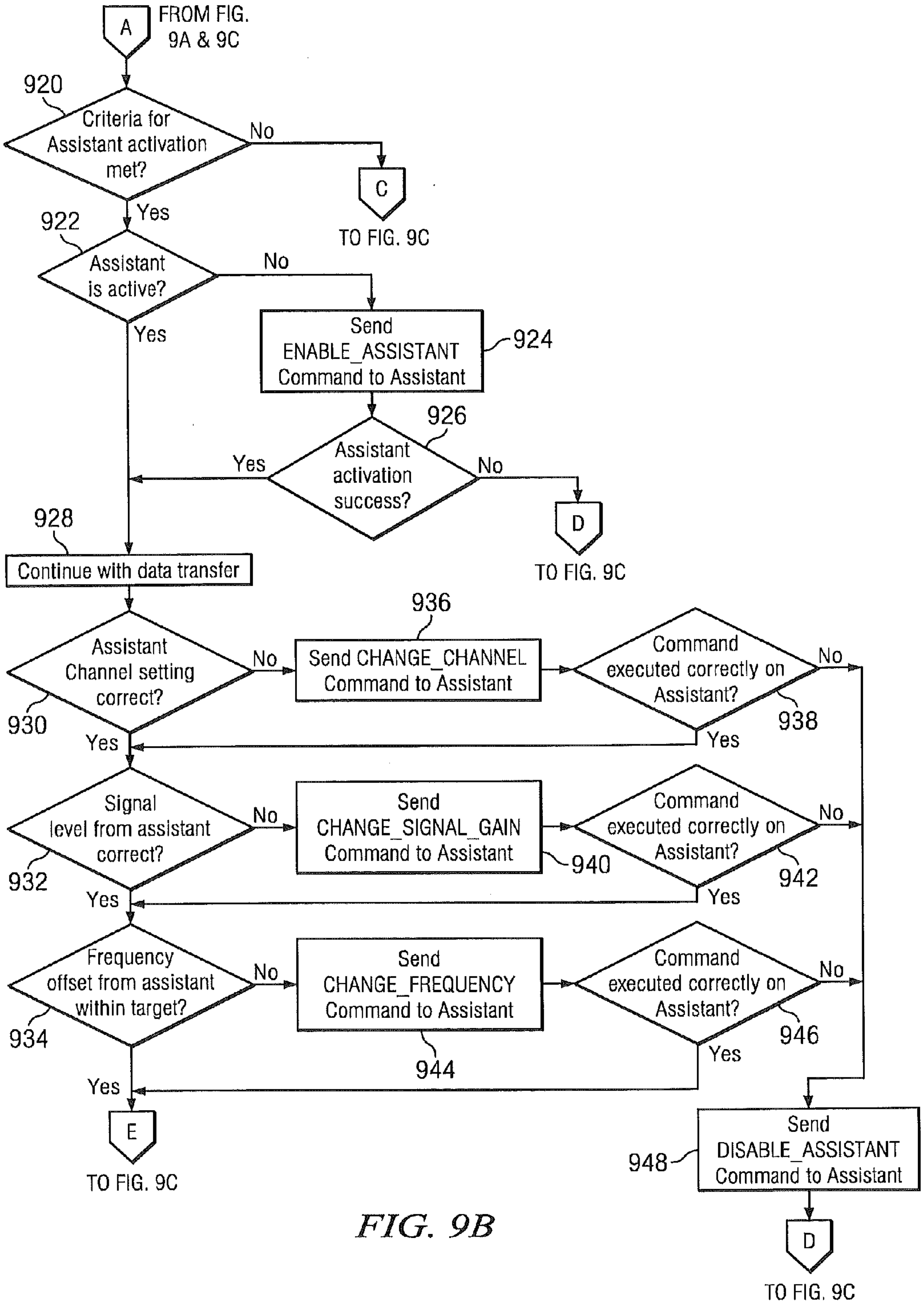
Figure 9C:
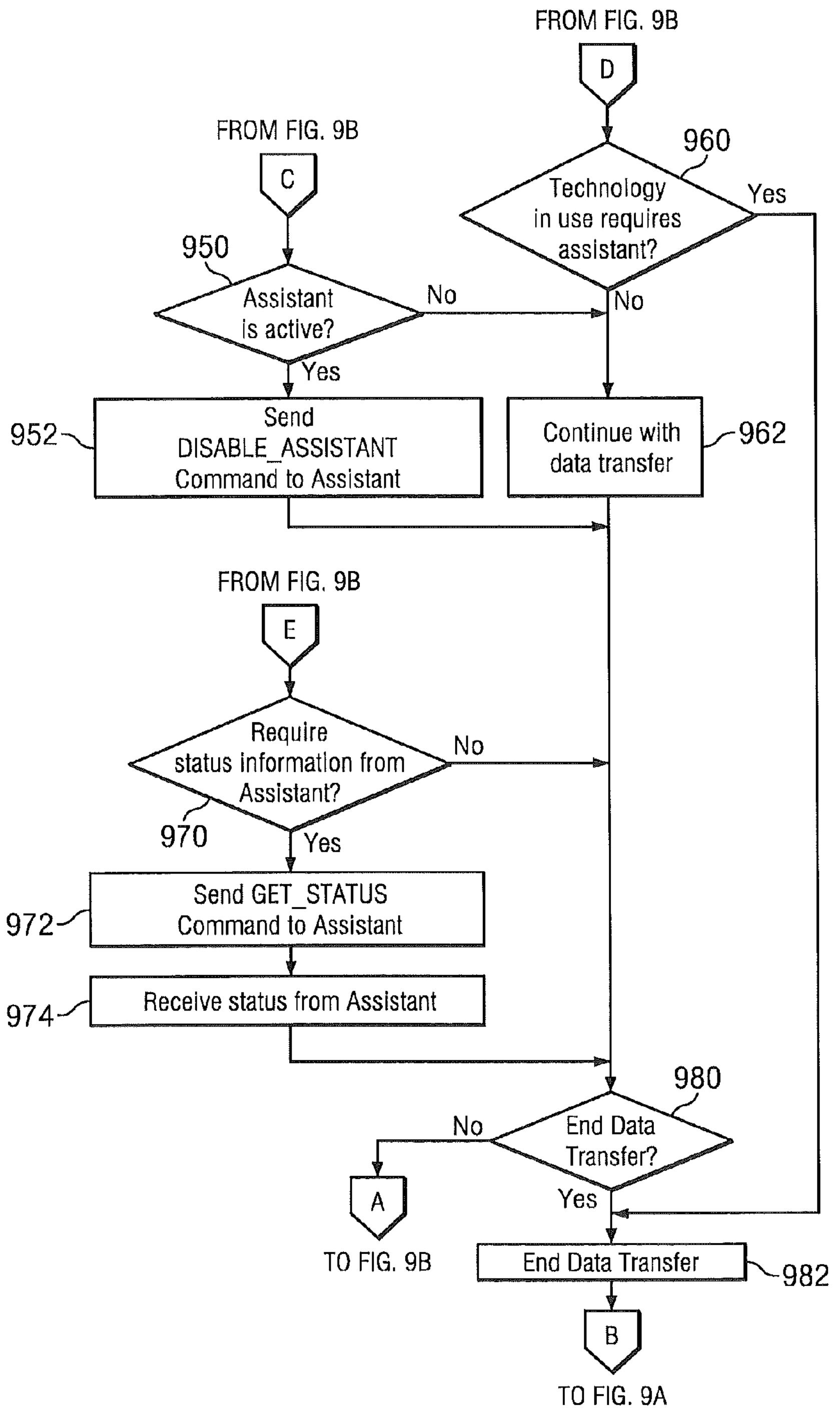

FIG. 9 is a flowchart 900 that includes partial views FIG. 9A, FIG. 9B and FIG. 9C to detail the operation of the user equipment assistant system in a wireless communication system in accordance with an illustrative embodiment of the disclosure. In the depicted exemplary partial views of FIG. 9A, FIG. 9B and FIG. 9C, flowchart 900 details the functional operation of user equipment assistant system, such as user equipment assistant system 502 of FIG. 5, comprising user equipment (UE) 504 and radio frequency assistant (Assistant) 540. Flowchart 900 details the control and management operations of the user equipment to the Assistant. The operational processes described in the blocks of flowchart 900 are not intended to be limiting to the process illustrated. Other variations to the process may be possible as will be recognized by one skilled in the art.

Referring first to FIG. 9A, the user equipment may continuously poll or check the Assistant to determine the operational status of the Assistant. The Assistant may be inactive or in a null state, such as null 710 state, where no commands are processed. The Assistant may be in sleep state, such as sleep 720 state, and ready to process commands. The Assistant may be in active state, such as active 730 state, and operational and responsive to commands. At block 902, the user equipment sends a GET_STATUS command to the Assistant to determine if the Assistant control channel modem is operational and ready to accept commands and waits for a response from the Assistant. At block 904, the user equipment determines if the Assistant has sent status in response to the GET_STATUS command.

The user equipment may not receive status from the Assistant. At block 906, the user equipment determines that communication between the user equipment and Assistant is not possible and may alert a user of the non-operational status of the Assistant. Communication may not be possible between the user equipment and the Assistant because the Assistant may be powered off or otherwise disabled. Manual user intervention may be required to perform a POWER_ON event to activate the Assistant.

Responsive to a status response being received from the Assistant, a check is performed at block 908 to determine whether the Assistant is in a sleep state or mode. In sleep state, the Assistant is operational and ready to accept commands and other information. A determination that the Assistant is in sleep state transitions the process to block 912 where it is determined whether a request for a data transfer exists.

A determination that the Assistant is not in a sleep state means that the Assistant is in an active state and the frequency transformer is on and operational. In the active state, the user equipment may send a DISABLE_ASSISTANT command to the Assistant at a block 910. The DISABLE_ASSISTANT command turns off or disables the frequency transformer and transitions the Assistant to the sleep state. From the sleep state, the user equipment baseband and control processor checks for a data transfer request at block 912.

The request for data transfer at block 912 checks a communication module, such as communications module 612 in FIG. 6, to determine whether a data transfer request that requires the activation or enabling of the Assistant control channel modem is pending for the wireless network.

Responsive to a determination that a data transfer request is not pending, at block 914, it is determined whether the Assistant should be turned off or powered down. The Assistant may be turned off in conjunction with the user equipment being powered off or powered down. The Assistant may be powered down through a command that is sent from the user equipment through the Assistant control channel modem. The microprocessor processes the command to turn off or power down the Assistant.

For example, responsive to a determination that the Assistant should be powered down, at block 916, a POWER_OFF command is sent to the Assistant and the Assistant is turned off. In another embodiment, the Assistant may also be powered down by a power off event.

It may be determined that the Assistant is not required to power down. At block 914, responsive to a determination that the Assistant is not required to be powered down, the process returns to block 902 and monitors the status of the Assistant by sending a GET_STATUS command to the Assistant and waiting for a response.

At block 912, the user equipment may determine that an active radio request for data transfer exists that requires the activation of the Assistant. Referring now to FIG. 9B, at block 920, the criteria for activation of the Assistant is checked. The criteria for activation of the Assistant may include, but is in no way limited to, signal quality metrics, data throughput requirements and other similar criteria.

For example, a radio frequency signal may be actively transmitting over a wireless radio link between the user equipment and the base station, but the quality or strength of the radio frequency signal has degraded below a predefined threshold. For example, the quality of the radio frequency signal may be negatively impacted or degraded during transmission by noise, external interference, or other factors known to one skilled in the art. The user equipment may determine that at or below this predefined threshold of signal quality, the Assistant should always be used or enabled. The user equipment monitors the signal quality to determine whether activation of the Assistant is required.

A determination may be made by the user equipment to activate the Assistant. The Assistant is activated by the user equipment to receive the same radio frequency signal transmitted to the user equipment. The Assistant amplifies the radio frequency signal and transforms it to a second radio frequency for transmission to the user equipment. In an embodiment, a data transfer request may require activation of the Assistant. In such a case, the initiation of a data transfer triggers the request to enable the Assistant.

A determination at block 920 that the criteria for Assistant activation are met results in an additional verification at block 922, to determine whether the Assistant is active. A determination at block 922 by the user equipment that the Assistant is active causes the operations related to the request for data transfer to continue at block 928 with a number of checks and verifications. At block 930, the user equipment verifies whether the channel setting of the Assistant is accurate and may adjust the channel setting by sending a CHANGE_CHANNEL command to the Assistant at block 936. At block 932, the user equipment may check the signal level setting of the Assistant. A CHANGE_SIGNAL_GAIN command may be sent to the Assistant control channel modem at block 940 to adjust the signal gain level. At block 934, the user equipment verifies whether the frequency offset of the Assistant is within the reference frequency of the user equipment. A command to adjust the frequency offset, CHANGE_FREQUENCY, may be sent to the Assistant at block 944.

The user equipment may check the processing of the Assistant after each command processed through the control channel modem by the microprocessor. The user equipment may determine that status information from the Assistant is required at FIG. 9C, block 970. For example, the user equipment may require status information on whether commands sent to the Assistant control modem were correctly executed on the Assistant.

The commands may include, without limitation, the command at a block 930 that checks the channel setting of the Assistant, the command at a block 932 that checks the signal level from the Assistant, and the command at a block 934 that determines whether the frequency offset of the frequency transformer is within a specified target. The user equipment sends a GET_STATUS command to the Assistant at a block 972. The status may be received from the Assistant at a block 974. At block 980, a determination may be made to end the data transfer at a block 982 or continually poll or check the Assistant at block 920 to determine whether the criteria for Assistant activation is met.

The user equipment verifies whether the commands that verify the operation of the Assistant frequency transformer are correctly executed at block 938, block 942, and block 946. An incorrect execution of the commands may cause the user equipment to disable the processing of the Assistant. The user equipment sends a DISABLE_ASSISTANT command at block 948 to disable the frequency transformer and transition the Assistant to the sleep state. The process then continues to FIG. 9C at a block 960 where the user equipment verifies whether the technology in use requires the use of an Assistant.

In FIG. 9B, a determination at block 922 that the Assistant is not active may cause the user equipment to attempt to activate the Assistant by sending an ENABLE_ASSISTANT command at block 924. The user equipment verifies the success of the ENABLE_ASSISTANT command at block 926 by determining whether the Assistant is operational. An Assistant that is operational Assistant will allow the user equipment Assistant system to continue with the data transfer at block 928.

In FIG. 9C, an unsuccessful activation of the Assistant will cause the user equipment to verify at block 960 whether the technology in use requires the use of an Assistant. A determination that the technology being used requires an Assistant results in the data transfer being terminated at block 982. A determination that the technology in use does not require an Assistant causes the data transfer to be continued at block 962.

Returning to FIG. 9B, at block 920, a determination that the criteria for Assistant activation is not met results in the processing being transferred to block 950. At block 950, an additional verification is performed to determine whether the Assistant is active or operational. A determination at block 950 that the Assistant is active may cause the user equipment to send a DISABLE_ASSISTANT command to the Assistant at block 952. At a block 980, the user equipment determines whether to end the data transfer at a block 982 or continually poll or check the Assistant at block 920 to determine whether the criteria for Assistant activation is met.

A determination at block 950 that the Assistant is not active results in the data transfer being continued at a block 962. At block 980, a determination may be made to end the data transfer at block 982 or continually poll or check the Assistant at block 920 to determine whether the criteria for Assistant activation is met.

Processes may terminate at block 982 with the end of a data transfer. At the termination of a process at block 982, the user equipment returns to checking the status of the Assistant at block 902.

Figure 10:
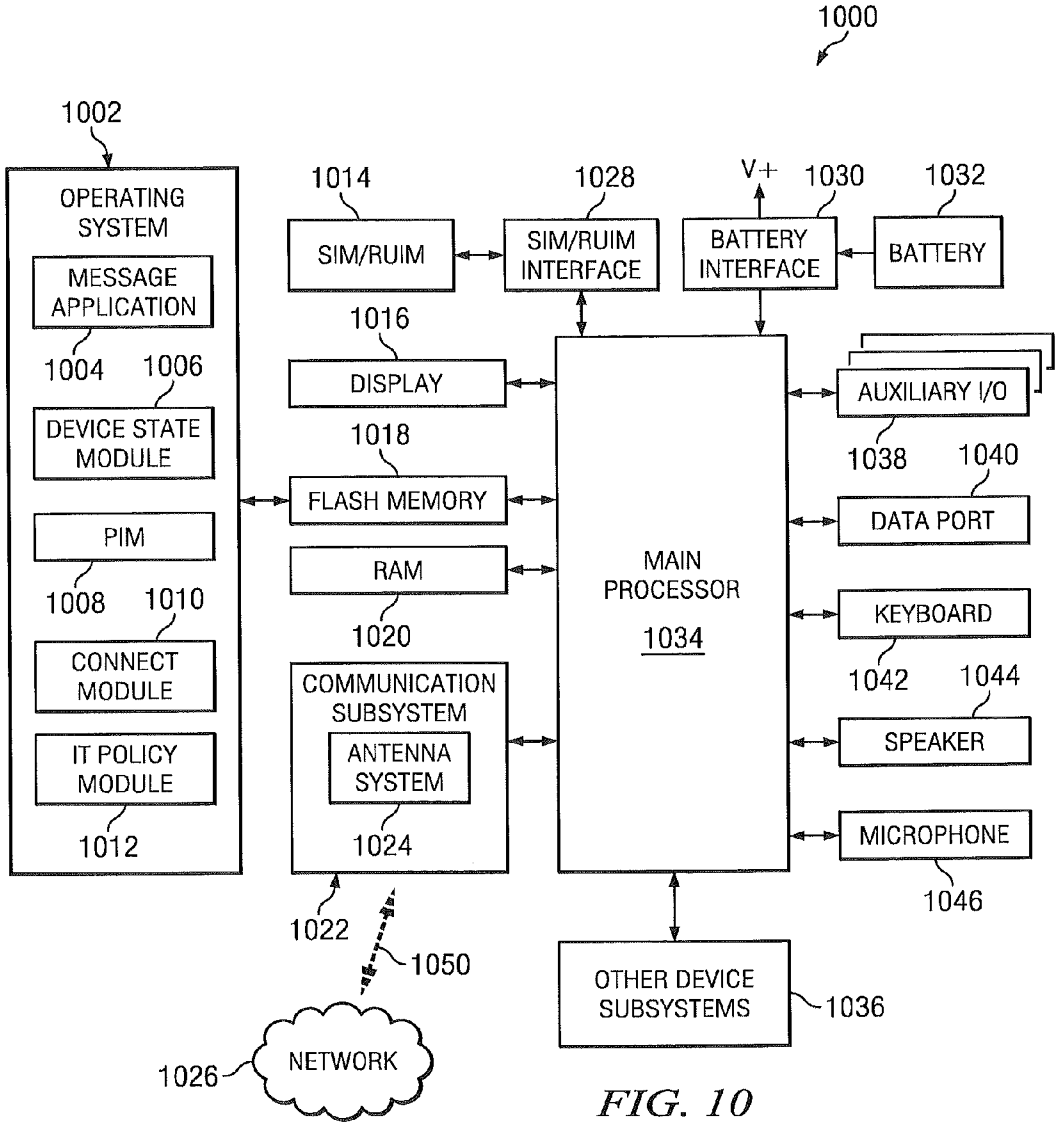
FIG. 10 is a block diagram of a user equipment according to an illustrative embodiment of the disclosure.

Referring now to FIG. 10, a block diagram of user equipment 1000 is illustrated according to an illustrative embodiment of the disclosure. User equipment 1000 may be a mobile wireless communication device, such as a mobile cellular device, herein referred to as a mobile device that may function as a Smartphone, which may be configured according to an information technology (IT) policy. User equipment 1000 may be configured to include all the functionality of a user equipment assistant system, such as the user equipment assistant system depicted in FIG. 1, instance 102.

User equipment 1000 includes communication elements in communication subsystem 1022 that may be configured to perform radio frequency translation functions similar to a radio frequency assistant, such as radio frequency assistant 106 of FIG. 1. Antenna system 1024 may configured to support multiple input multiple output technology. Antenna system 1024 may include a plurality of antennas for simultaneous radio frequency signal transmissions.

The term information technology, in general, refers to a collection of information technology rules, in which the information technology policy rules may be defined as being either grouped or non-grouped and global or per user. The terms grouped, non-grouped, global and per-user are defined further below. Examples of applicable communication devices include pagers, mobile cellular phones, cellular smart-phones, wireless organizers, personal digital assistants, computers, laptops, handheld wireless communication devices, wirelessly enabled notebook computers and such other communication devices.

The mobile device is a two-way communication device with advanced data communication capabilities including the capability to communicate with other mobile devices, computer systems, assistants through a network of transceivers. In FIG. 10, the mobile device includes a number of components such as main processor 1034 that controls the overall operation of user equipment 1000. Communication functions are performed through communication subsystem 1022. Communication subsystem 1022 receives messages from and sends messages across wireless link 1050 to wireless network 1026.

Communications subsystem 1022 provides for communication between the mobile device 1000 and different systems or devices such as antenna system 1024, without the use of the wireless network 1026. For example, communications subsystem 1022 may include an infrared device and associated circuits and components for short-range communication. Examples of short-range communication standards include standards developed by the Infrared Data Association (IrDA), Bluetooth, and the 802.11 family of standards developed by Institute of Electrical and Electronics Engineers (IEEE). Short range communications may include, for example, without limitation, radio frequency signals within a 2.4 GHz band or a 5.8 GHz band.

In this illustrative embodiment of the mobile device, the communication subsystem 1022 is configured in accordance with the Global System for Mobile Communication (GSM) and General Packet Radio Services (GPRS) standards. The GSM/GPRS wireless network is used worldwide and it is expected that these standards will be superseded eventually by, for example, without limitation, Evolved Enhanced Data GSM Environment (EEDGE) and Universal Mobile Telecommunications Service (UMTS)), High Speed Packet Access (HSPA), Long Term Evolution (LTE), and other standards applicable to multiple input multiple output technology. New standards are still being defined, but it is believed that they will have similarities to the network behavior described herein, and it will also be understood by persons skilled in the art that the embodiments described herein are intended to use any other suitable standards that are developed in the future.

The wireless link 1050 connecting the communication subsystem with wireless network 1026 represents one or more different radio frequency (RF) channels, operating according to defined protocols specified for GSM/GPRS communications. With newer network protocols, these channels are capable of supporting both circuit switched voice communications and packet switched data communications. Communication systems, such as user equipment assistant system 502 of FIG. 5, are implemented by antenna system 1024 of communication subsystem 1022. The user equipment assistant system 502 is implemented between network 1026 and main processor 1034 and enables the mobile device to have a higher data rate and a higher throughput.

Although the wireless network 1026 associated with mobile device 1000 may be a GSM/GPRS/EDGE wireless network in one illustrative implementation, other wireless networks may also be associated with the mobile device 1000 in variant implementations. Examples of these networks include, but are not limited to, Code Division Multiple Access (CDMA) or CDMA2000 networks, GSM/GPRS/EDGE networks (as mentioned above), third-generation (3G) networks such as UMTS, HSPA, and also future fourth-generation (4G) networks such as such as LTE and Worldwide Interoperability for Microwave Access (WiMax).

The main processor 1034 also interacts with additional subsystems such as Random Access Memory (RAM) 1020, a flash memory 1018, a display 1016, an auxiliary input/output (100) 1038 subsystem, a data port 1040, a keyboard 1042, a speaker 1044, a microphone 1046, and other device subsystems 1036.

Some of the subsystems of the mobile device 1000 perform communication-related functions, whereas other subsystems may provide "resident" or on-device functions. By way of example, the display 1016 and the keyboard 1042 may be used for both communication-related functions, such as entering a text message for transmission over the network 1026, and device-resident functions such as a calculator or task list.

The mobile device 1000 can send and receive communication signals over the wireless network 1026 after required network registration or activation procedures have been completed. Network access is associated with a subscriber or user of the mobile device 1000. To identify a subscriber, the mobile device 1000 requires a Subscriber Identity Module or a Removable User Identity Module, SIM/RUIM module 1014, to be inserted into a SIM/RUIM interface 1028 in order to communicate with a network. The SIM/RUIM module 1014 is one type of a conventional "smart card" that can be used to identify a subscriber of the mobile device 1000 and to personalize the mobile device 1000, among other things. Without the SIM/RUIM module 1014, the mobile device 1000 is not fully operational for communication with the wireless network 1026.

By inserting the SIM/RUIM module 1014 into the SIM/RUIM interface 1028, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM module 1014 includes a processor and memory for storing information. Once the SIM/RUIM module 1014 is inserted into the SIM/RUIM interface 1028, it is coupled to the main processor 1034. In order to identify the subscriber, the SIM/RUIM module 1014 can include some user parameters such as an International Mobile Subscriber Identity (IMSI).

An advantage of using the SIM/RUIM module 1014 is that a subscriber is not necessarily bound by any single physical mobile device. The SIM/RUIM module 1014 may store additional subscriber information for a mobile device as well, including datebook (or calendar) information and recent call information. Alternatively, user identification information can also be programmed into the flash memory 1018. The mobile device 1000 is a battery-powered device and includes a battery interface 1030 for receiving one or more rechargeable batteries 1032. In at least some embodiments, the battery 1032 can be a smart battery with an embedded microprocessor. The battery interface 1030 is coupled to a regulator (not shown), which assists the battery 1032 in providing power V+ to the mobile device 1000. Although current technology makes use of a battery, future technologies such as micro fuel cells may provide the power to the mobile device 1000.

The mobile device 1000 also includes an operating system 1002 and software components 1004 to 1012 which are described in more detail below. The operating system 1002 and the software components 1004 to 1012 that are executed by the main processor 1034 are typically stored in a persistent store such as the flash memory 1018, which may alternatively be a read-only memory (ROM) or similar storage element (not shown). Those skilled in the art will appreciate that portions of the operating system 1034 and the software components 1004 to 1012, such as specific device applications, or parts thereof, may be temporarily loaded into a volatile store such as the RAM 1020. Other software components can also be included, as is well known to those skilled in the art.

The subset of software applications 1036 that control basic device operations, including data, voice communication applications, antenna system 1024, and communication subsystem 1022 applications will normally be installed on the mobile device 1000 during its manufacture. Other software applications include a message application 1004 that can be any suitable software program that allows a user of the mobile device 1000 to send and receive electronic messages.

Various alternatives exist for the message application 1004 as is well known to those skilled in the art. Messages that have been sent or received by the user are typically stored in the flash memory 1018 of the mobile device 1000 or some other suitable storage element in the mobile device 1000. In at least some embodiments, some of the sent and received messages may be stored remotely from the device 1000 such as in a data store of an associated host system with which the mobile device 1000 communicates.

The software applications can further include a device state module 1006, a Personal Information Manager (PIM) 1008 and other suitable modules (not shown). The device state module 1006 provides persistence which means that the device state module 1006 ensures that important device data is stored in persistent memory, such as the flash memory 1018, so that the data is not lost when the mobile device 1000 is turned off or loses power.

The PIM 1008 includes functionality for organizing and managing data items of interest to the user, such as, but not limited to, e-mail, contacts, calendar events, voice mails, appointments, and task items. A PIM application has the ability to send and receive data items via the wireless network 1026. PIM data items may be seamlessly integrated, synchronized, and updated via the wireless network 1026 with the mobile device subscriber's corresponding data items stored or associated with a host computer system. This functionality creates a mirrored host computer on the mobile device 1000 with respect to such items. This can be particularly advantageous when the host computer system is the mobile device subscriber's office computer system.

The mobile device 1000 also includes a connect module 1010, and an information technology (IT) policy module 1012. The connect module 1010 implements the communication protocols that are required for the mobile device 1000 to communicate with the wireless infrastructure and any host system, such as an enterprise system, with which the mobile device 1000 is authorized to interface.

The connect module 1010 includes a set of application programming interfaces (APIs) that can be integrated with the mobile device 1000 to allow the mobile device 1000 to use any number of services associated with the enterprise system. The connect module 1010 allows the mobile device 1000 to establish an end-to-end secure, authenticated communication pipe with the host system. A subset of applications for which access is provided by the connect module 1010 can be used to pass IT policy commands from the host system to the mobile device 1000. This can be done in a wireless or wired manner. These instructions can then be passed to the IT policy module 1012 to modify the configuration of the device 1000. Alternatively, in some cases, the IT policy update can also be done over a wired connection.

The IT policy module 1012 receives IT policy data that encodes the IT policy. The IT policy module 1012 then ensures that the IT policy data is authenticated by the mobile device 1000. The IT policy data can then be stored in the flash memory 1018 in its native form. After the IT policy data is stored, a global notification can be sent by the IT policy module 1012 to all of the applications residing on the mobile device 1000. Applications for which the IT policy may be applicable then respond by reading the IT policy data to look for IT policy rules that are applicable.

Other types of software applications can also be installed on the mobile device 1000. These software applications can be third party applications, which are added after the manufacture of the mobile device 1000. Examples of third party applications include games, calculators, utilities, and other similar applications know to one skilled in the art.

The additional applications can be loaded onto the mobile device 1000 through the wireless network 1026, the auxiliary I/O 1038 subsystem, the data port 1040, the communication subsystem 1022, or any other suitable device subsystem 1036. This flexibility in application installation increases the functionality of the mobile device 1000 and may provide enhanced on-device functions, communication-related functions, or both. For example, secure communication applications may enable electronic commerce functions and other such financial transactions to be performed using the mobile device 1000.

The data port 1040 enables a subscriber to set preferences through an external device or software application and extends the capabilities of the mobile device 1000 by providing for information or software downloads to the mobile device 1000 other than through a wireless communication network. The alternate download path may, for example, be used to load an encryption key onto the mobile device 1000 through a direct and thus reliable and trusted connection to provide secure device communication.

The data port 1040 may be any suitable port that enables data communication between the mobile device 1000 and another computing device. The data port 1040 may be a serial or a parallel port. In some instances, the data port 1040 may be a USB port that includes data lines for data transfer and a supply line that can provide a charging current to charge the battery 1032 of the mobile device 1000.

In operation, a received signal such as a text message, an e-mail message, or web page download will be processed by the communication subsystem 1022 and input to the main processor 1034. The main processor 1034 will then process the received signal for output to the display 1016 or alternatively to the auxiliary I/O subsystem 1038. A subscriber may also compose data items, such as e-mail messages, for example, using the keyboard 1042 in conjunction with the display 1016 and possibly the auxiliary I/O subsystem 1038. The auxiliary I/O subsystem 1038 may include devices such as: a touch screen, mouse, track ball, infrared fingerprint detector, or a roller wheel with dynamic button pressing capability. The keyboard 1042 is preferably an alphanumeric keyboard together with or without a telephone-type keypad. However, other types of keyboards may also be used. A composed data item may be transmitted over the wireless network 1026 through the communication subsystem 1022.

For voice communications, the overall operation of the mobile device 1000 is substantially similar, except that the received signals are output to the speaker 1044, and signals for transmission are generated by the microphone 1046. Alternative voice or audio I/O subsystems, such as a voice message recording subsystem, can also be implemented on the mobile device 1000. Although voice or audio signal output is accomplished primarily through the speaker 1044, the display 1016 can also be used to provide additional information such as the identity of a calling party, duration of a voice call, or other voice call related information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein.

In one embodiment, implementations of the technology described in this disclosure may include a computer readable medium of instructions capable of being executed by a processor. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. In another embodiment, the computer readable media may take the form of coded formats that are decoded for actual use in a particular data processing system. For example, the instructions may include microcode, hard wired controls or a combination thereof. Other implementations would be recognized by one skilled in the art.

The embodiment or embodiments selected are chosen and described in order to best explain the principles of the embodiments, the practical application, and to enable others of ordinary skill in the art to understand the disclosure for various embodiments with various modifications as are suited to the particular use contemplated. For example, the various elements or components may be combined or integrated in another system or certain features may be omitted or not implemented.

Also, techniques, systems, and subsystems, and described and illustrated in the various embodiments as discrete or separate may be combined or integrated with other systems, modules, or techniques without departing from the scope of the present disclosure. Other items shown or discussed as coupled or directly coupled or communicating with each other may be indirectly coupled or communicated through some other interface, device or intermediate component whether electrically, mechanically, or otherwise. Other examples of changes, substitutions, and alterations are ascertainable by one skilled in the art and could be made without departing from the spirit and scope disclosed herein.

What is claimed is:

1. A wireless communication system, comprising:

a radio frequency assistant activated to transform and repeat a radio frequency signal responsive to commands received wirelessly by the radio frequency assistant;

a user equipment that configures and controls the radio frequency assistant through the wireless commands, the radio frequency assistant and the user equipment being configured to operate together as a single system; and wherein an operating frequency of the radio frequency assistant is set based upon a command received over the wireless link.

2. The wireless communication system of claim 1, wherein the single system is a user equipment assistant system and the user equipment receives signals from the radio frequency assistant and another radio frequency signal.

3. The wireless communication system of claim 2, further comprising:

a number of base stations comprising a number of antennas configured to transmit data at a first frequency to the user equipment assistant system over a plurality of paths, wherein the user equipment controls the radio frequency assistant of the user equipment assistant system to transform the first frequency to a second frequency.

4. The wireless communication system of claim 1, wherein the user equipment comprises:

a first transceiver that receives a first radio frequency signal at a first frequency a second transceiver that receives a second radio frequency signal from the radio frequency assistant at a second frequency; and a baseband and control processor that processes the first radio frequency signal and the second radio frequency signal;

wherein the radio frequency assistant transforms a radio frequency signal at the first frequency to the second radio frequency signal.

5. The wireless communication system of claim 4, further comprising:

a first control channel modem in the user equipment that transmits the commands from the baseband and control processor to the radio frequency assistant.

6. The wireless communication system of claim 5, wherein the radio frequency assistant comprises:

a frequency transformer that transforms the first radio frequency signal received in a first radio frequency band to the second radio frequency signal in a second radio frequency band and transmitting the second radio frequency signal to the user equipment.

7. The wireless communication system of claim 6, wherein the radio frequency assistant further comprises:

a second control channel modem configured to communicate over a wireless link to the first control channel modem and receive the commands transmitted wirelessly from the first control channel modem of the baseband and control processor; and a microprocessor that processes the commands transmitted to the second control channel modem.

8. The wireless communication system of claim 7, wherein the microprocessor is communicatively coupled to the frequency transformer to process commands that control the frequency transformer.

9. The wireless communication system of claim 7, wherein the number of commands comprises a plurality of computer executable instructions that are executed by a microprocessor in the radio frequency assistant.

10. The wireless communication system of claim 1, wherein the user equipment is a mobile cellular device and the single system is a multiple input multiple output wireless system.

11. A wireless apparatus that processes radio frequency signals, comprising:

a frequency transformer configured to transform, responsive to a control signal, a first radio frequency signal received in a first radio frequency band to a second radio frequency signal in a second radio frequency band wherein the wireless apparatus transmits the second radio frequency signal to a user equipment, responsive to commands received wirelessly from the user equipment;

wherein the user equipment enables the control signal to control a configuration of the frequency transformer, and an operating frequency of the frequency transformer is set based upon a command wirelessly received from the user equipment.

12. The wireless apparatus of claim 11, further comprising:

a first antenna communicatively coupled to the frequency transformer;

wherein the first antenna receives the first radio frequency signal and also transmits the second radio frequency signal.

13. The wireless apparatus of claim 11, further comprising:

a microprocessor that enables the frequency transformer to transform the first radio frequency signal to the second radio frequency signal.

14. The wireless apparatus of claim 13, further comprising:

a control channel modem communicatively coupled to the microprocessor and the user equipment, the control channel modem enabling a transfer of commands from the user equipment that controls the frequency transformer.

15. The wireless apparatus of claim 13, further comprising a second antenna communicatively coupled to the frequency transformer;

wherein the first antenna receives the first radio frequency signal and the second antenna transmits the second radio frequency signal.

16. In a wireless communication system, a method of assisting radio frequency reception, the method comprising:

wirelessly activating a radio frequency assistant with a user equipment; and transforming the first radio frequency signal to a second radio frequency signal by the radio frequency assistant, responsive to commands being received from the user equipment, wherein an operating frequency of the radio frequency assistant is set based upon a command received wirelessly from the user equipment.

17. The method of claim 16, further comprising:

assigning a unique identification to the radio frequency assistant that pairs the radio frequency assistant to operate with the user equipment.

18. The method of claim 16, wherein the radio frequency assistant is activated by the user equipment responsive to a quality of the first radio frequency signal being below a predefined threshold.

19. The method of claim 16, further comprising:

controlling a gain and frequency of the second radio frequency signal transformed by the radio frequency assistant through commands sent by the user equipment.

20. The method of claim 16, wherein the configuring comprises:

sending a number of the commands from the user equipment that control operations of the radio frequency assistant.

* * * * *